United States Patent [19]

Van Allen et al.

[11] Patent Number: 4,492,281

[45] Date of Patent: Jan. 8, 1985

[54] WEIGH SCALE

[75] Inventors: Kent Van Allen, New Baltimore; James M. Bordato, Grosse Pointe Wds., both of Mich.

[73] Assignee: Scans Associates, Inc., Livonia, Mich.

[21] Appl. No.: 353,171

[22] Filed: Mar. 1, 1982

[51] Int. Cl.³ .................. G01G 7/00; G01G 19/52; G01G 3/14

[52] U.S. Cl. .................... 177/213; 177/50; 177/210 FP

[58] Field of Search .................. 177/213–215, 177/210 FP, 50

[56] References Cited

U.S. PATENT DOCUMENTS 3,738,438  6/1973  Ellner .................. 177/215 X

Primary Examiner—George H. Miller, Jr.
Attorney, Agent, or Firm—Dolgorukov & Dolgorukov

[57] ABSTRACT

The specification discloses an improved weigh scale of the dual beam type having large and small flow buckets adapted to receive a flow of fluid therein, and an encoder connected to a ball screw having a poise weigh driven by a drive motor for keeping the scale continually balanced while a fluid is being introduced into one of said flow buckets, and having a power supply circuit, a pulse encoder circuit, and a poise control circuit for operation thereof, the improvement including an improved poise control circuit having low gain with high integration for use during the run mode, but being switchable to a circuit having high gain and derivative action during the calibration mode.

16 Claims, 22 Drawing Figures

WEIGH SCALE

The present invention relates to an improved weigh scale apparatus for use in calibrating such flow meters based on a variable weight-fixed time principle, rather than on a fixed weight-variable time system, which was previously used in the art.

Present day flow meter calibration systems work on the principle of measuring the time it takes a fixed weight of fluid that has passed through a flow meter to collect in a weigh tank which is suspended on a scale beam, which in most cases is a compound beam arrangement because large flows are involved.

The compound beam arrangement has a small beam and a large beam, sometimes referred to as a "tare" and a "weigh beam", respectively. Usually on the top of the tare beam is an adjustable weight to set the zero point of the scale, and on the end of the tare beam is a pan in which precision weights are placed by the operator. To provide the most accuracy possible, the beam is usually of a type known as a knife-edge beam.

Used in conjunction with the scale is an electronic timer indicating directly in units and tied to its own crystal frequency standard, for example, a crystal oscillator.

In operation, the present state of the art systems, based on fixed weight-variable time, would be started up before an actual test and you would have a reservoir being supplied through a pump, a filter, a heat exchanger, and a float control valve. The fluid flowing through the flow meter being tested would flow through the above devices, and the circuit would be completed by a back pressure control and a conduit leading to the pan on a weigh scale, with the weigh scale being able to dump directly into the reservoir.

In these systems, because the flow of the fluid is temperature sensitive, heat exchanger equipment would typically control the temperature of the fluid to plus or minus 1° F., after which it would pass through the control valve, the meter under test, the back pressure valve, the weigh tank and then back into the reservoir. This type of action would take place for a predetermined amount of time until the system is temperature stabilized.

A preliminary fill of the system would then take place after the operator has adjusted the flow control valve to bring the float in the flow meter to the point at which it is desired to test such flow meter. After this flow has been established, a small weight is placed on the pan of the weigh scale, the electronic timer is set to zero, and the dump valve would be closed, starting the filling of the weigh tank. Since the placing of the weight put the scale off balance, this preliminary fill time would end when an actuator was tripped, indicating the scale was again in balance.

By using the preliminary fill it should be understood that the scale is then placed in a dynamic condition overcoming initial friction and so forth. When the scale is back in balance and a weight of fluid is in the weigh tank equal to the small weight which has previously been placed on the weigh scale, the actual weight desired to be measured is placed on the weigh pan, again deflecting the beam. Since the timer had also been reset when this scale reached its balanced condition, it can be seen that the timer is now actually counting the amount of time necessary for the scale to again reach its balance condition, or, in other words, the amount of time for a predetermined amount of weight to be flowed into the weigh tank. The timer will lock when the scale is again in balance, after which time the dump valve on the weigh tank will open, allowing the fluid to pass through to the reservoir and complete the cycle previously described. Such variable time-fixed weight systems have had useable accuracy at high flows over many years of service. While such accuracies were satisfactory for applications existing up to the present day, increased technology, and the move to economical operation of such things as gasoline engines, and their being of ever smaller sizes, has brought to the forefront the need to measure ever smaller flow rates at ever greater accuracy.

Applicants' assignee has been a manufacturer of carburetor testing equipment who has been directly involved in the testing of automotive carburetors for many years, and has seen the flow rate for automotive carburetors decrease from several pounds per hour to as low as one-half pound per hour and, in order to test carburetors at such low flows, it is necessary to have more accurate flow meters than were heretofore available. Applicants, therefore, several years prior to the present application, have had to recalibrate flow meters calibrated by the old fixed weight-variable time system, since such system simply was not accurate enough to calibrate flow meters to the accuracy necessary for the present day requirements, such as carburetors of smaller and smaller engines.

Applicants' assignee attributed the failures of the fixed weight-variable time system to several reasons. First of all, a serious problem was inherent in the system. When one wished to calibrate a flow meter at a certain spot, the operator of the calibration system, by means of a hand valve, brought the float to a certain level and had to manually keep it there throughout the test. When large flow was involved, things which were found to affect the movement of the float at low flows, such as pulsation inherent in the previously mentioned pump, were not present, and the operator could fairly accurately "eyeball" the float level. However, it was found that when low flows were attempted with the same setup, say flows below five pounds per hour, the pulsations present in the flow because of the type of pump made the float move so much that the operator simply could not eyeball it to the proper level with any degree of accuracy and the system provided no repeatability whatsoever.

Thus, the eyeballing problem and the repeatability problem were two of the problems which led Applicants' assignee to abandon the fixed weight-variable time system. Other problems that were found to exist were frictional problems inherent in the weigh scale used in such system. Since such prior art systems were mainly used for large flows, which necessarily resulted in a large weight being accumulated in the weigh pan in a short period of time, the frictional effects on the accuracy of the measurements were negligible. However, again, when flowing below five pounds per hour, it was found that the frictional effects of the scale had a significant effect on the measurements.

Another problem which was found was related to the previous eyeballing problem, in that the physical limitations of the operator in eyeballing the float to the proper position meant that rather large separations between graduations on the flow meter were a necessity. Again, when large flows were involved this was no problem, but when low flows (below five pounds per hour) were used, these large distances between graduations represented large differences in flow, and the improved readability needed at low flow simply was not achievable.

Applicants, despite many attempts, found that attempting to overcome the failings of the fixed weight-variable time flow meter calibration systems were futile because of their inherent nature and thus, Applicants has to abandon the fixed weight-variable time system and attempt to solve the problems of flow meter calibration based on the only other physically possible type of system, that being one based on a measuring a weight for a fixed period of time, known as a variable flowfixed time system.

Thus, one of the objects of the present invention is to provide a weigh scale for a flow meter calibration system operating on the variable weight-fixed time theory of operation.

Another object of the present invention is to provide an improved dynamic weigh scale for a flow meter calibration system capable of calibrating all types of flow meters used in the art today, such as rotary flow meters, turbine flow meters and glass tube flow meters.

Another object of the present invention is to provide an improved dynamic weigh scale for a flow meter calibration system useable for calibrating flow meters having very low flow rates.

Another object of the presennt invention is to provide an improved dynamic weigh scale for a flow meter calibration system of the foregoing nature which can calculate flow meters to one quarter percent accuracy or better.

A further object of the present invention is to provide an improved dynamic weigh scale for use in a flow meter calibration system capable of calibrating flow meters adapted to measure minute flows.

A further object of the present invention is to provide improved circuitry for a weigh scale system of the foregoing nature which is dependable and repeatable in operation.

Further objects and advantages of this invention will be apparent from the following description and appended claims, reference being had to the accompanying drawings forming a part of this specification, wherein like reference characters designate corresponding parts in the several views.

Figure 1:
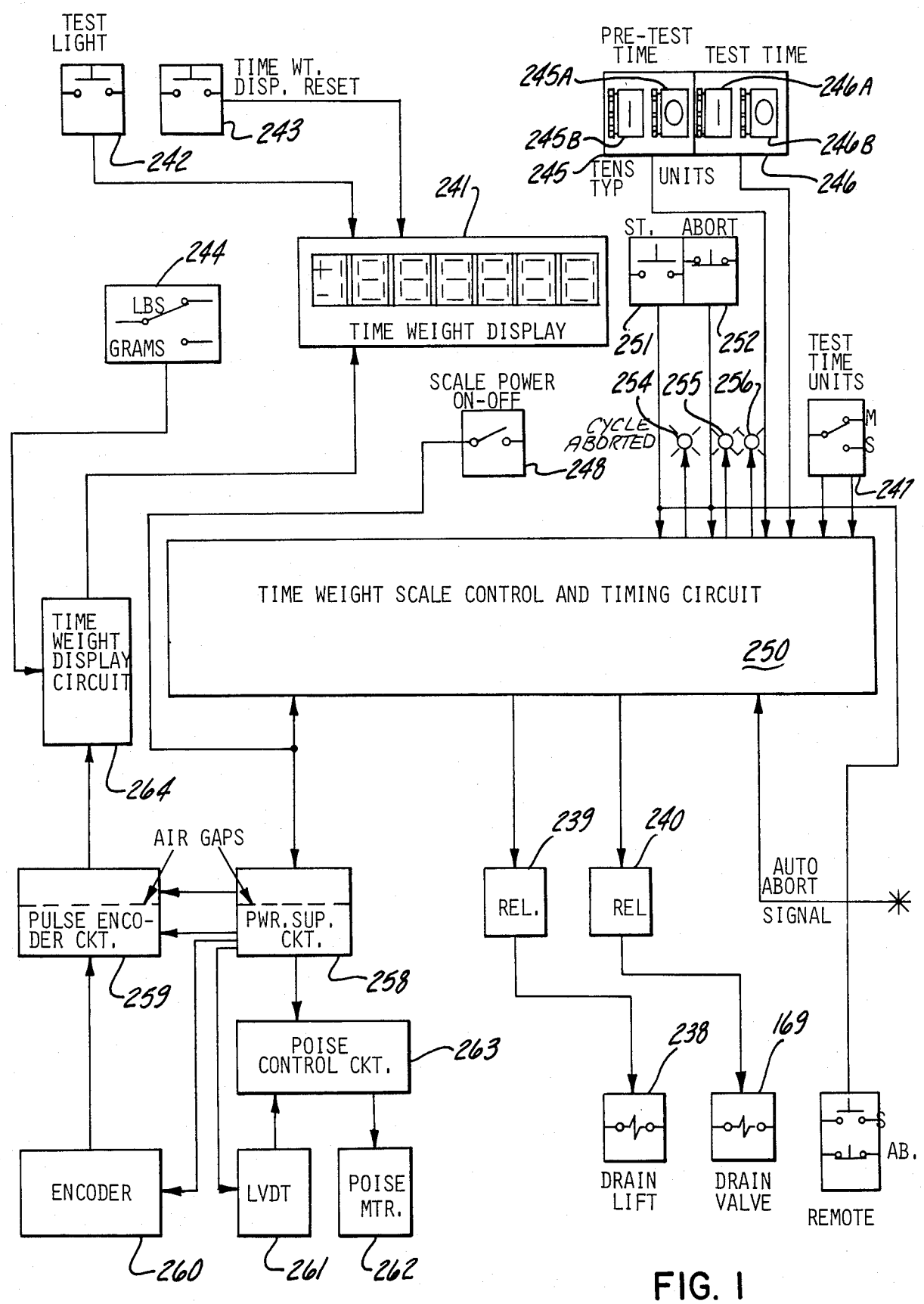
FIG. 1 is a diagrammatic view of a weigh scale subsystem which might be used in a flow meter calibration system, such weigh scale subsystem having as one of its components a weigh scale having my improved circuitry thereon.

Applicants, in an attempt to design a flow meter calibration system which would give accurate and dependable results at low flows, for example, zero to five pounds per hour, first considered continuing to use the fixed weight-variable time system heretofore described. However, despite several attempts, while such system was satisfactory for large flows, it was entirely unsatisfactory for low flows, and Applicants were unsuccessful in increasing the accuracy of such system beyond a very minimal amount, as no way was found to reduce the mechanical friction of the scale in a sufficient degree to eliminate that problem, or to reduce the pulsation of the fuel in such a system. Therefore, Applicants abandoned their attempt at modifying the fixed weight-variable time system, and decided instead to go to a fixed time-variable weight system, in which the float in the flow meter, in the case where it is a glass tube flow meter being calibrated, would be set, and a flow would be measured for a fixed period of time.

In doing so, Applicants still had to solve the problem of how to eliminate the operator factor in tracking the float, and how to weigh the flow through the flow meter for a fixed period of time accurately and without introducing the same problems of friction and human error which the prior art systems had.

To remove the operator from the position of weighing the flow of fuel from the flow meter for a fixed period of time. It might appear easy to some that we should simply let the flow, whatever it may be, pass into the bucket for one minute and then measure the same. However, we would then introduce exactly the same type of error which the fixed weight-variable time system had, i.e. the adding of the weight to the scale by the operator, and the time keeping function, together with, if we used the same type of scale, the frictional problems which were present in the old system, and this simply would not be a satisfactory solution to the problem.

Based on our knowledge of scales which attempt to keep themselves balanced as weight is added to them by means of a movable poise weight, which, if a consideration of the balancing of moments are taken into account, together with accurate calibration, means that the movement of the poise alone will tell you the flow into the scale during any period of time, we attempted to go in this direction, and ultimately did, after making several attempts and failing at them. Our first attempt was to use a known scale manufactured by the Tridyne Corporation which performed this way. This scale had the aforementioned poise weight drive by means of a ball screw and ball nut, but because this scale did not have the drive motor directly connected to the ball screw, but had a stepper motor hung below and geared to the ball screw, mechanical tolerances were introduced which were unsatisfactory. Even though one step of the stepper motor presumably equaled 0.00005 pounds in the weigh bucket, we found that the count of the stepper motor pulses did not always guarantee a turning of the ball screw by the correct amount because of the hysterisis through the gearing system.

Furthermore, the Tridyne scale still had a friction error which it introduced into the measurements which, although much less than the old weigh beam scale used in the fixed weight-variable time system, was still significant when used for very low flows, and we felt we had to have a better weigh scale for very low flows.

In our attempts to design our own scale to overcome the deficiencies of the Tridyne scale, we developed the scale used in a commercial system of Applicants' assignee described in Bulletin 6622. In this system, liquid from the flow orifice being calibrated was allowed to flow into the selected container for a pretest time to be sure that it was flowing freely and uniformly, and then the poise weight position was noted when the test time was started. The liquid was measured for a fixed priod of time, for example, one minute, and then the poise position was again noted.

By the balancing of moments principle, and calibration of the scale in advance, the movement of the poise weight gave you the weight of the liquid which had flowed during the one minute time. Because in this scale, the poise weight was directly driven by a stepping motor, a source of mechanical error was eliminated which was present in the Tridyne scale, and this scale gave much more accurate results.

However, we discovered that there was still a source of frictional error present in the scale which proved significant at low flows. This was because of the wires which had to be attached to the scale to transmit power to the poise, and to the linear variable displacement transformer, which is°the signaling device which measures the actual displacement of the weigh pan and transmits signals to govern the speed of the movement of the poise weight to keep the scale in balance. Even though the wires were attached in such a manner to produce a very low resistance to movement, at low flows this resistance was felt, and had to be eliminated. Thus, we had to perform further work on this scale to eliminate this source of error, and developed the idea of transmitting power to the various components of the scale through an air gap transformer to prevent the frictional error in the previous scale.

In order to determine the flow through a flow meter at these various positions according to our method, it is necessary to establish a constant flow and measure it for a fixed period of time. As explained previously, this is in contrast to systems old in the art which operated on the basis of fixing the weight and measuring a variable time of flow until that weight of fluid flowed into a weigh pan. This is accomplished by our weigh scale subsystem 88.

The flow coming through the flow meter must now be measured accurately and in a manner so as to eliminate the inaccuracies present in measuring in the systems old in the art. Depending on the flow rate of the fuel, such fuel will either be supplied to one or more of the small injectors 159, or the large injectors 160. These injectors will either flow into a low flow gathering device 161, or a high flow gathering device 162, which are representative of devices to be explained further below which absorb any kinetic energy due to the force of the fluid leaving the injectors, and then allows the flow to flow either in the low flow bucket 163 or the high flow bucket 164.

The fluid may be allowed to remain in the bucket, or may be extracted from the bucket by the high flow extraction tube 165, or the low flow extraction tube 166, which are raised or lowered into the bucket by means of the tube bracket 167 being reciprocally raised and lowered by the extraction cylinder 168. The fluid being removed from the buckets when the extraction tubes are lowered is selectively removed from one tube or the other by means of the extractor solenoid valve 169 which selects the tube from which the fluid will be removed, and this fluid is removed by means of the extraction pump 129 being operated by the motor 130 and returned to the tank return 122. Thus, we provide for the removal of the kinetic energy of the fluid as a source of error.

We further provide for removal of inaccuracies in the system by providing for all electronic connections to be made by an air gap transformer, to be described, which provides for the removal of any drag on the scale, such as was present in the old scales using magnetic switches.

We also provide for the scale to be very accurately calibrated in advance so that each position of the poise weight 171 is related to a position of the ball screw 170, which is driven by the drive motor 173. The optical shaft encoder enables us to know the precise position of the poise weight as a function of the number of revolutions of the ball screw 170. In this way, no matter what weight is placed on the scale platform, the amount of weight on the scale, since the poise weight will automatically travel to a position to bring the scale in equilibrium, will always be known.

We have now solved the problems of the pulsating flow and evaporation of the fluid being measured at low flows by providing for measurements of the flow into the scale in a dynamic fashion, in which we establish a flow into the scale and continually move the poise weight at a rate to keep the scale in equilibrium while the fluid is flowing into the bucket. We also drastically minimize the effects of kinetic energy errors due to dripping of the fluid into the tank at very low flow rates and minimize the evaporation which could take place with volatile fluids at low flows. The reason that this occurs, is due to the dynamic operation of the scale and the integrating effects of the electronics, wherein the poise weight is constantly moving as the flow is going into the scale buckets, thus averaging out the effects of the drippings into the bucket.

The evaporation is minimized by weighing at the same time that you are flowing into the bucket. Because you are not having to wait a finite amount of time after the flow occurs before you weigh the amount in the bucket. Also, you are not having to move the bucket in any way before it is weighed, which could make the possibility of an air current dissipate any evaporative fumes which may be present, and this effect may be further eliminated with very low flows by providing covers on the buckets, etc.

Referring now to FIGS. 2, 1, 3 and 4, there are shown in varying degrees of detail, the electronics needed to operate the weigh scale subsystem. Referring first to FIG. 1, it can be seen that there is a time weight scale control and timing circuit 250 which is central to the operation of the weigh scale subsystem. Into the circuit are fed signals from the power supply by the scale power on-off switch 248, which the operator depresses when he wishes to put the weigh scale subsystem in operation.

Also supplying signals to the time weight scale control and timing circuit 250 are the pretest time select switch 245 on which the operator selects the pretest time in seconds by operation of the pretest time select thumbwheel switches 245A and 245B. The signal supplied by the thumbwheel switches need not be described in detail, as these are commercially available units, and the instructions therewith amply inform one skilled in the art of the type of signal which may be obtained therefrom.

The operator also selects the test time on the test time select switch 246 in seconds or minutes by setting the test time select thumbwheels 246A and 246B. This will also supply a signal to the time weight scale control and timing circuit. The units in seconds and minutes which the pretest time select switch 245 and the test time select switch 246 are in is selected by the operator by the means of the test time unit select switch 247 which is connected to the time weight scale control and timing circuit 250 as shown.

The scale control and timing circuit 250, in a manner to be described hereinafter in more detail, receives the signals just discussed and, in turn, output signals to many devices. Among them will be a signal to the drain lift relay 239 to operate the drain lift valve 238, which physically lifts the evacuation tubes 165 and 166 out of the low flow bucket 163 and high flow bucket 164 as desired by the operator, by means of the extractor cylinder 168. This occurs automatically when the cycle start button 251 is pushed.

The operator, to start the test, must push the cycle start button 251 previously described, and if the test must be aborted for any reason, he has an abort switch 252 available to him should the occasion arise. To indicate to the operator the condition, or the status, of the mode of the weigh scale subsystem there are provided a cycle abort light, a cycle light and a test light 254, 255 and 256 respectively. Once all of these signals are supplied to the time weight scale control and timing circuit 250, this circuit can begin its operation and, in turn, supply further signals to the various other circuits.

Primary among these are the circuits that control the actual weigh scale to dynamically weigh the fuel as it is put into the flow buckets 163 or 164 as previously discussed. These circuits include the power supply circuit 258 which supplies power to the electronics of the weigh scale and is connected to the poise control circuit 263, which is the circuitry that keeps the scale level by moving the poise weight while the scale is filling with the fluid flowing through the flow meter. This is accomplished by means of the poise motor 262 and the linear variable displacement transformer 261, in combination with the encoder 260.

The encoder 260, in turn, supplies a signal to the pulse encoder circuit which enables one to determine the position of the scale and calculate the weight that has been placed in the scale during the test time. This signal is then supplied to the time weight display circuit 264 which makes the calculations necessary to display the weight on the time weight display 241. A pounds/grams select switch 244 is operatively connected to the time weight display circuit so that the time weight display will either read in grams or pounds.

Connected to the time weight display 241 is a weigh scale display test switch 242 which lights up all the segments of the time weight display when it is depressed. Also connected to the time weight display 241 is a weigh scale reset button 243.

Figure 2:
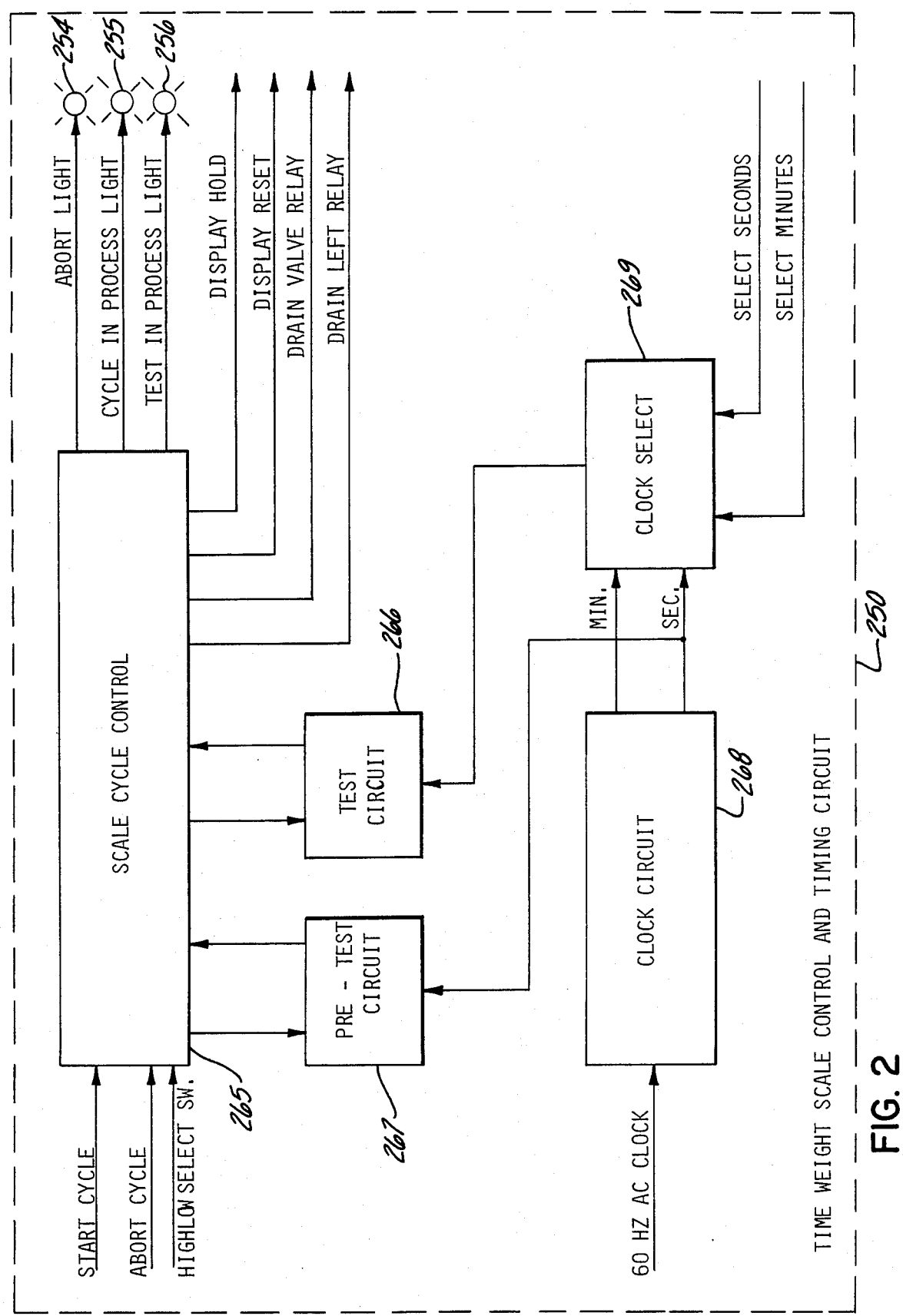
FIG. 2 is a block diagram of the time weight scale control and timing circuit shown in FIG. 1.
Figure 3:
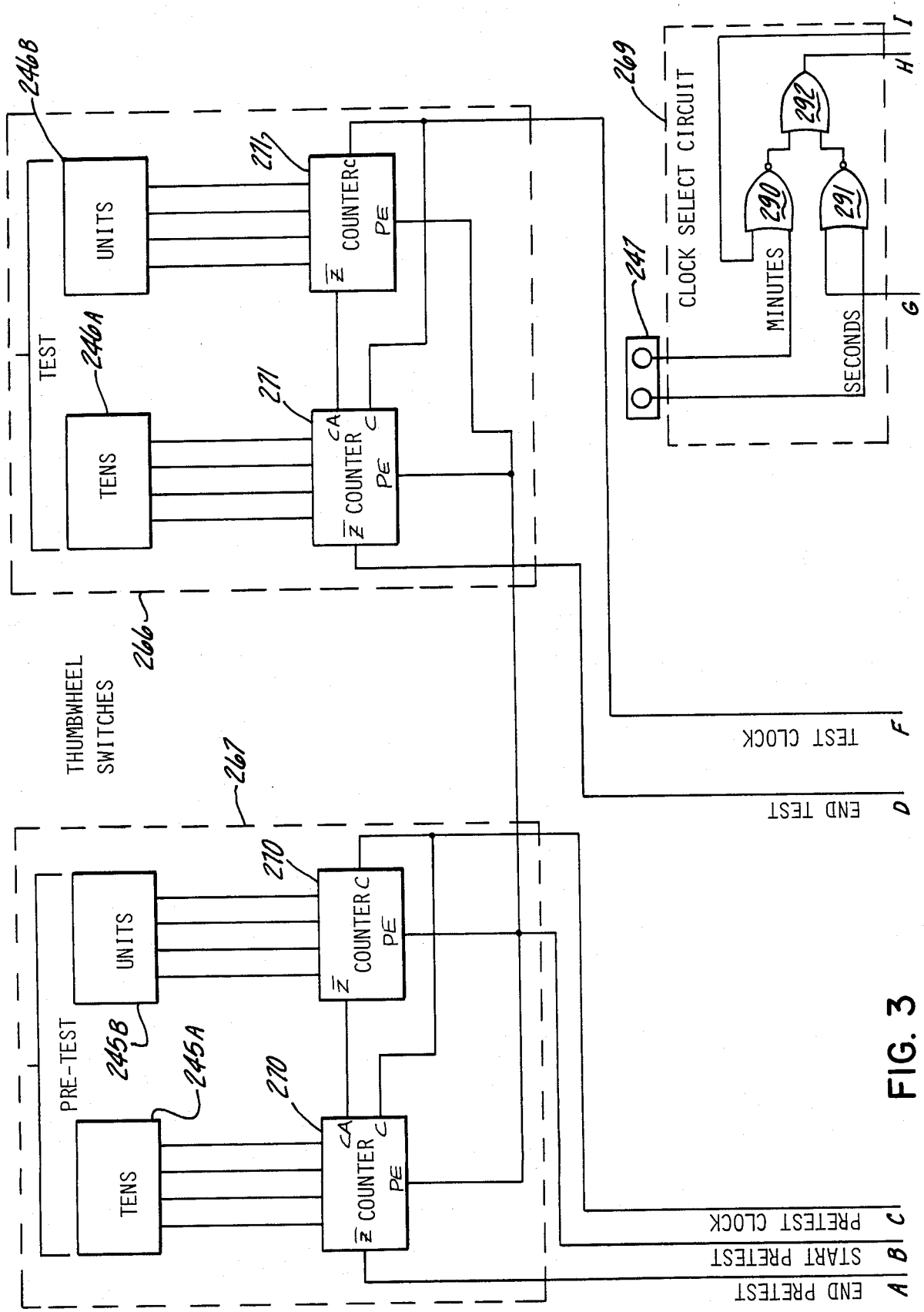
FIG. 3 is a circuit diagram of the pretest test and clock select circuits of the time weight scale control and timing circuit of FIG. 2.
Figure 4:
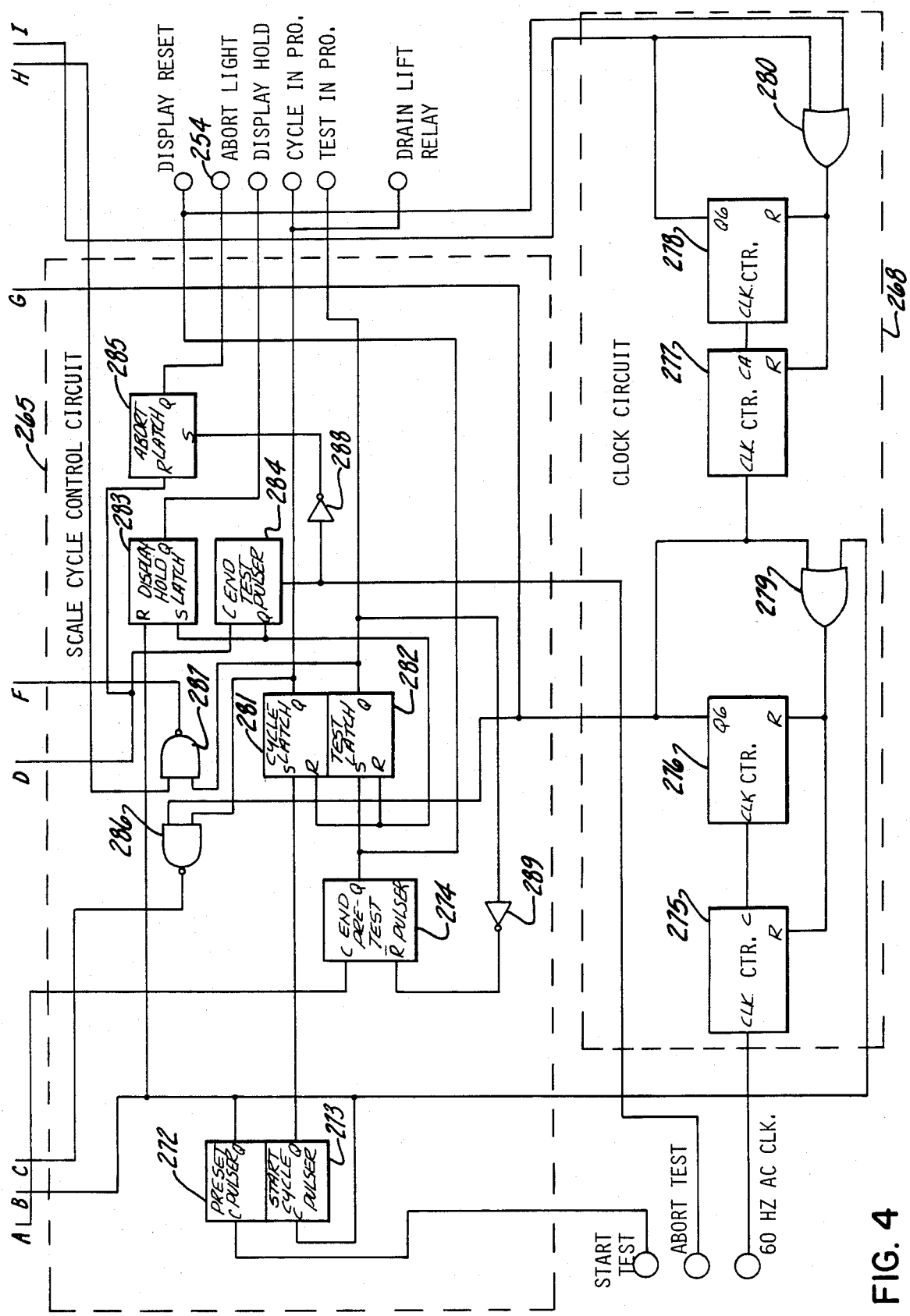
FIG. 4 is a circuit diagram of the clock circuit and scale cycle control circuit shown in FIG. 2.

A more detailed illustration of the time weight scale control and timing circuit 250 is shown in FIG. 2. As can be seen in FIG. 2, the time weight scale control and timing circuit can be further broken down into a scale cycle control circuit 265 which sends and receives signals via connections to the pretest circuit 267 and the test circuit. Connected to the test circuit is a clock select circuit 269 which receives a signal from the test time unit switch 247 previously described on FIG. 1. To enable it to supply the proper time interval to the test circuit, it receives minutes and second inputs from the clock circuit 268. Since the pretest time is always in seconds, seconds are directly supplied from the clock circuit 268 to the pretest circuit 267 and, in turn, to the scale cycle control 265.

All of this enables the scale cycle control 265 whenever a start cycle signal is received from the cycle start button 251, together with a high flow-low flow select signal from the the high flow-low flow select switch 197 to light the cycle in process light 255, to choose between the high flow extractor tube 165 or the low flow extractor tube 166, and to also operate the drain lift relay 239 to operate the drain lift relay 240 to remove the extractor tubes 165 and 166 from the scale high flow and low flow buckets 163 and 164 respective.

If for some reason an abort cycle signal is received from the abort test switch 252, the scale cycle control 265 also has the ability to light the abort light 254, turn off the cycle in process light and/or the test in process lights 255 and 256 respectively, send a display hold signal to the time weight display 241 to freeze the display, and operate the drain lift relay 239 to operate the drain lift 238 in a manner to lower the extractor tubes 165 and 166 into the high flow and low flow buckets 163 and 164 respectively.

Also, if the test is operating normally, at some point the pretest time will be completed, and then the test in process light 256 will light, and the cycle in process light 255 will remain lit, and at the same time a brief display reset pulse will be supplied to the time weight display 241 to reset it to zero.

Assuming the test runs normally to completion, at some point the test circuit 266 will signal the end of test, at which time the cycle in process light and the test in process lights are turned off, a display hold signal is supplied to the time weight display 241 to freeze the reading thereon, a signal is supplied to the drain valve relay 240, and a signal is supplied to the drain lift relay 239 to operate the drain lift 238 to lower the extractor tubes 165 and 166 into the buckets 163 and 164. For a more detailed illustration of the cycle control circuit 265 to describe the manner in which the pretest circuit 267 supplies signals to the scale cycle control circuit 265 to determine the length of the pretest portion of the flow meter calibration, one may refer to the illustration of the pretest circuit 267 on FIG. 3.

As before, the operator sets the pretest time in by means of the pretest thumbwheel switches 245A and 245B which are connected in a manner well known in the art to identical pretest counters 270, which are adapted to include a start pretest signal and send end pretest and pretest clock signals and receive the pretest clock.

Likewise, the test circuit 266 receives signals from the test time select switch 246 through the thumbwheel switches 246A and 246B which are operatively connected to identical counters 271. The same start pretest signal which loaded the counters 270 in the pretest circuit 267 is used to load the counters in the test circuit 266. The counters 271 are adapted to receive the test clock signal from the second NAND gate 287 which receives a signal from the cycle latch 281 everytime a signal is received from the start cycle pulser 273, which occurs when the start test signal is applied to the reset pulser 272.

As can be seen, the same start pretest signal that loads the counters 270 and 271 is also used to reset the display hold latch 283. The display hold latch 283 (FIG. 4) is, in turn, set or turned on by the end test pulser 284, and this causes a display hold signal to be sent from the display hold latch. The end test pulser will turn on the display hold latch when a signal is received. Two things may cause the end test pulser 284 to send a signal to a display latch. Either an end test signal coming down from the counters 271 to the end test pulser 284, or an abort test signal, which will cause a test to end at any time.

If the end test pulser 284 is activated by an abort test signal, a signal is also sent through the first inverter 288 to the set input of the abort latch 285, which causes an output to the abort light to be sent. It should be understood that the abort latch has a reset input which is dependent on the end test signal coming from the counters 271. When the counters 271 are loaded by the start pretest signal, the end test signal is turned off, thus resetting the abort latch 285. Thus, the abort latch is continually reset, ready to receive the abort test signal at any time.

The end pretest signal coming from the counter 270 in the pretest circuit 267 comes down and enters the clock input of the end pretest pulser 274, causing the Q output from the end pretest pulser to cause the weigh scale display 241 to reset. Such output then continues through the set input of the test latch, causing the Q output from the test latch to send a test in process signal. That output is also supplied through the second inverter 289 to reset the end pretest pulser 274 and enable it to receive the next subsequent end pretest signal.

When the output of the end pretest pulser 274 is providing a display reset signal, the same output is provided to one input of the second clock OR gate 280, which causes the third and fourth clock counters to be reset to zero. It can be seen that the third and fourth counters, 277 and 278 respectively, are second and minute counters respectively, by tracing the circuit from the input from a 60-hertz AC clock to the clock input of the first counter 275, which also is inputted to the second counter 276. Since the first counter 275 is a decade counter, and does not reset itself, it has the effect of dividing the input of the 60-hertz AC clock by ten and making a 6-hertz input to the clock input of the second counter 276. We choose to use an output from the Q6 output of said counter, which gives this counter the effect of additionally dividing by six, making the Q6 output a 1-hertz output. This output is supplied to the clock input of the third counter 277, which will be described later, and every time the Q6 output passes through the first clock OR gate 279, the first and second counters, 275 and 276 respectively, are reset.

The Q6 output is used for many purposes in our circuit. It is supplied to an input of the first NAND gate 286 which, every time it receives a signal from the Q output of the cycle latch 281, enables the clock to be passed to the counters 270. Since the cycle latch output has previously been inputted to the other side of the first NAND gate 286, such a signal being the pretest enable signal, this allows the pretest clock signal to be supplied to the counters 270.

Also, the Q6 output of the second clock counter 276 is then supplied to the clock select circuit 269. This clock signal is applied to the one input of the second clock select NOR gate 291 causing an output to be supplied to the OR gate 292 which, in turn, causes an output to be supplied to the second NAND gate 287, and causes the output from the OR gate 292 to be supplied as an input to the second NAND gate 287. The test latch 282, at this time will enable the output of the test clock signal to the counter 271 in the test circuit 266.

As previously mentioned, the Q6 output of the second counter was a 1-hertz output. That output, as can be seen, is also supplied to the clock input of the third clock counter 277, which is a further decade counter, which divides by ten and supplies that output to the input of the fourth clock counter 278. By again taking a Q6 output from the counter, we have effectively divided the 1-hertz clock signal by an additional factor of sixty, to have a 1/60-hertz signal, or one-minute signal, which is supplied both to the input of the second clock OR gate 280 to reset the third and fourth clock counters 277 and 278 respectively, and also to the input of the first clock select NOR gate 290.

The signal to the first clock select NOR gate 290, which arrives every minute, causes an output from the NOR gate at like intervals which is then supplied, as before, to the second NAND gate 287, which has been previously enabled, and thus causes the gate 287 to put out the test clock signal at one-minute intervals rather than one-second intervals.

It must be understood that the first clock select OR gate 292, and the first and second clock select NOR gates, 290 and 291 respectively, are enabled, or disabled, by the inputs from the test time unit select switch 247. For example, if the seconds line is always allowed to be high, and the minutes line is kept continuously low, only the first clock select NOR gate 290 will be enabled to pass signals through it to the OR gate 292, and in this fashion you have selected the minutes unit. If the situation is reversed, and the minutes line is kept high, the seconds line will be kept low, enabling the second clock select NOR gate 291 to provide the signal to the OR gate 292, and thus you will have selected a signal every second to the pretest as the test clock signal.

It therefore can be seen that the test clock signal, if it is in seconds, and the unit thumbwheel switch 246B is set at five, for example, will cause, in a manner well known in the art, the counter 271 to count five test clock signals before supplying the end test signal to the rest of the system. Similarly, if the minutes unit is selected, the test clock signal will arrive every minute, and if the unit thumbwheel switch 246 is set at five, the end test signal will not be supplied for five minutes. Thus, the operator is enabled to very carefully select the pretest and the test time and control them by means of the scale cycle control, the clock select circuit, and the clock circuits, 269, 265 and 268 respectively.

Having now selected the test time, the operator must turn his attention to the operation of the weigh scale to accurately measure the flow for the test time. As previously discussed, ours is a dynamic system. The means to control the scale, as described in FIGS. 1, 5 and 6, include a pulse encoder circuit operatively connected to a power supply circuit 258. The power supply circuit 258 supplies power to the encoder 260, the linear vertical displacement transformer (LVDT) 261 and the poise control circuit 263. Operatively connected to the poise control circuit is the poise motor 262.

Figure 5:
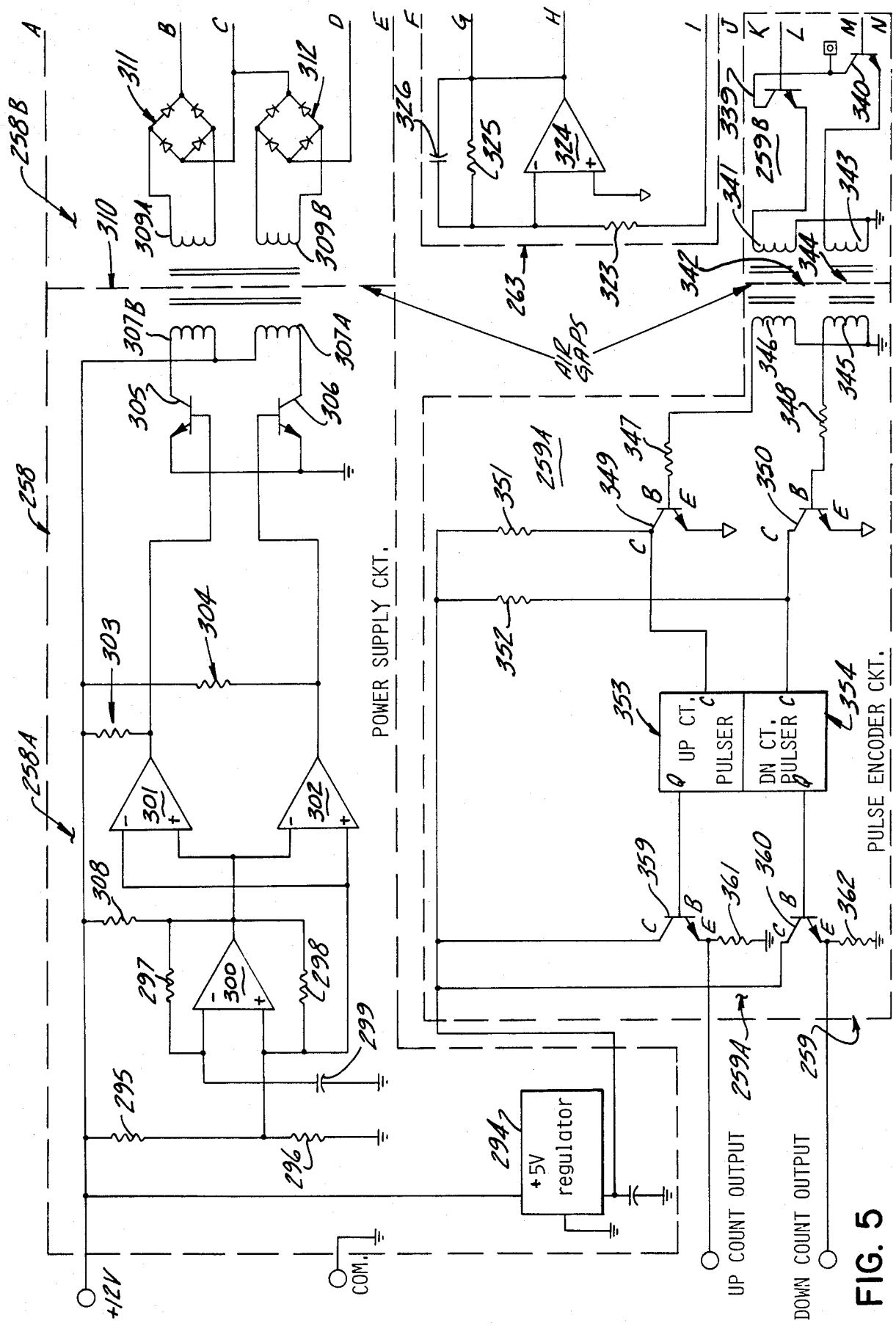
FIG. 5 is an electrical diagram of a portion of the power supply circuit, the pulse encoder circuit and a portion of the poise control circuit shown in FIG. 1.
Figure 6:
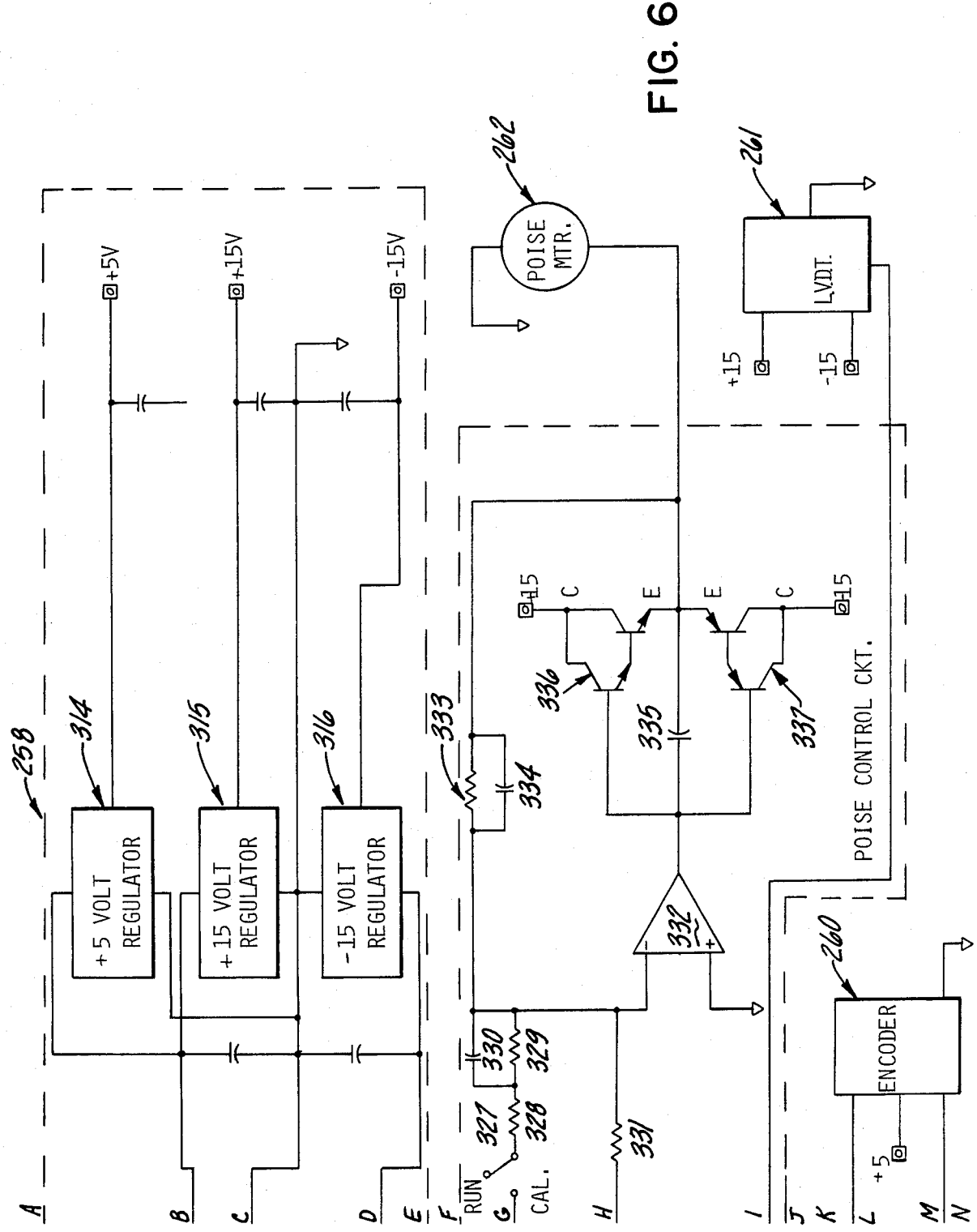
FIG. 6 is an electrical diagram showing a portion of the power supply circuit, a portion of the poise control circuit and the encoder, as shown in FIG. 1.

Now referring to FIGS. 5 and 6, it can be seen that there is first provided a power supply circuit 258. It should be noted that a portion of the power supply circuit labeled 258A, and a portion of the pulse encoder circuit 259A are mounted in the stationary portion of the air gap transformer as indicated in FIG. 5, while the remaining portion of the power supply circuit 258B, the remaining portion of the pulse encoder circuit 259B, as well as the poise control circuit 263 are mounted on the rotatable portion of the air gap transformer as shown in FIG. 6.

To now understand the operation of the power supply circuit 258, it can be seen that system common and a positive 12-volt power are brought to the power supply circuit as shown in FIG. 5. Since we desire to use an air gap transformer to supply power to the components mounted on the scale, such as the drive motor and the encoder, etc., to eliminate friction which is present in previous measuring scales due to electrical connections, etc., we must transform the 12-volt power supply in our system to an alternating current. We do this by using a known inverter circuit connected in the manner shown in FIG. 5, consisting of a first voltage divider resistor 295 and a second voltage divider resistor 296 connected in series between system common and the system voltage.

Also in the inverter circuit as shown, is a frequency determining capacitor 299, positive and negative feedback resistors, 297 and 298 respectively, together with an oscillator operational amplifier 300, a positive driver operational amplifier 301, and a negative driver operational amplifier 302. The outputs of the amplifiers 301 and 302 are, in turn, connected as shown to a first pull-up resistor 303 and a second pull-up resistor 304 and, in turn, to a positive switching transistor 305 and a negative switching transistor 306 which have their collectors connected to the primary coil 307 of the air gap transformer at 307A and 307B respectively. A third pull-up resistor 308 is also connected as shown.

Figure 9A:
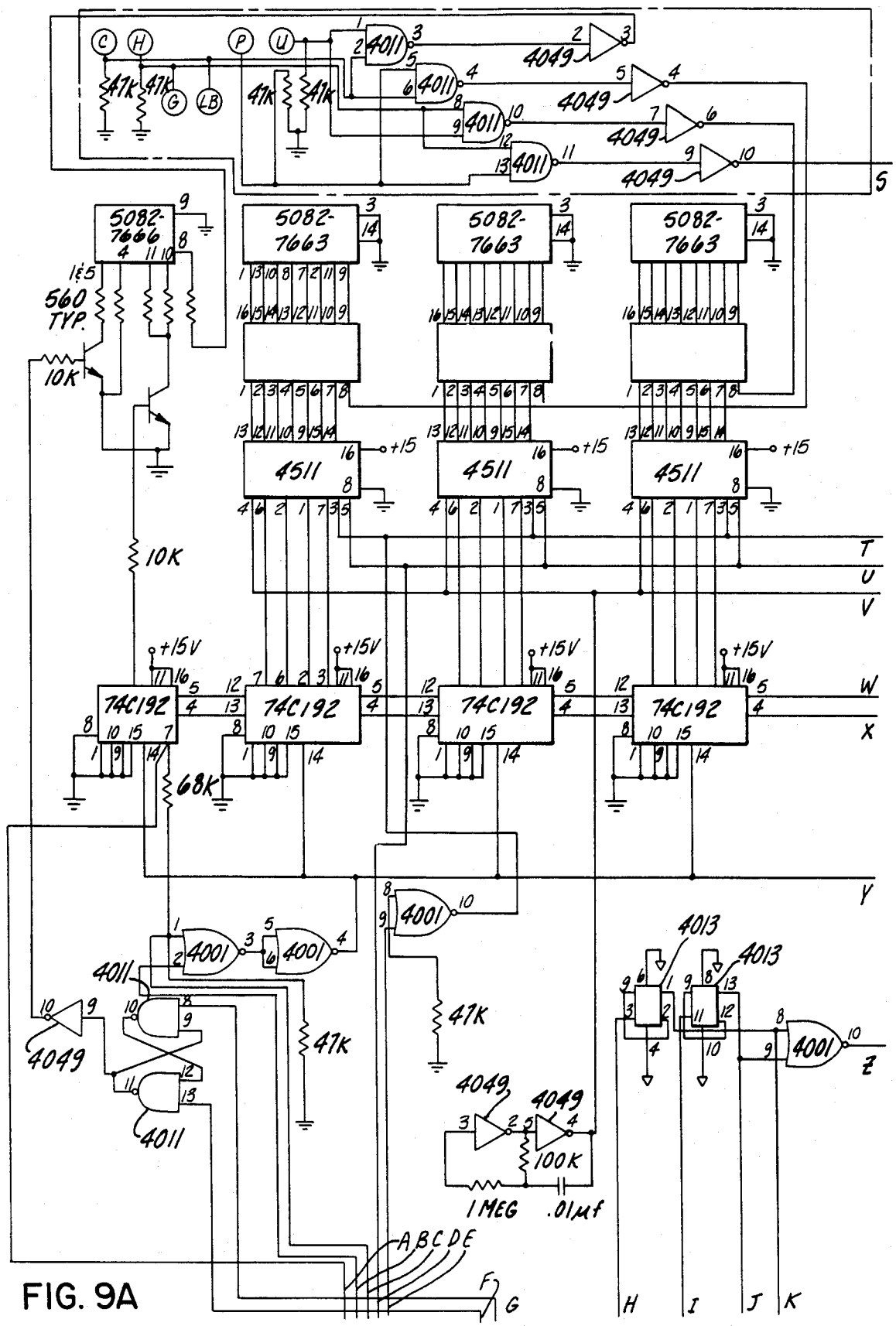
FIG. 9A–9C are schematic diagrams of the circuits shown in FIGS. 8A and 8B as actually built.
Figure 9B:
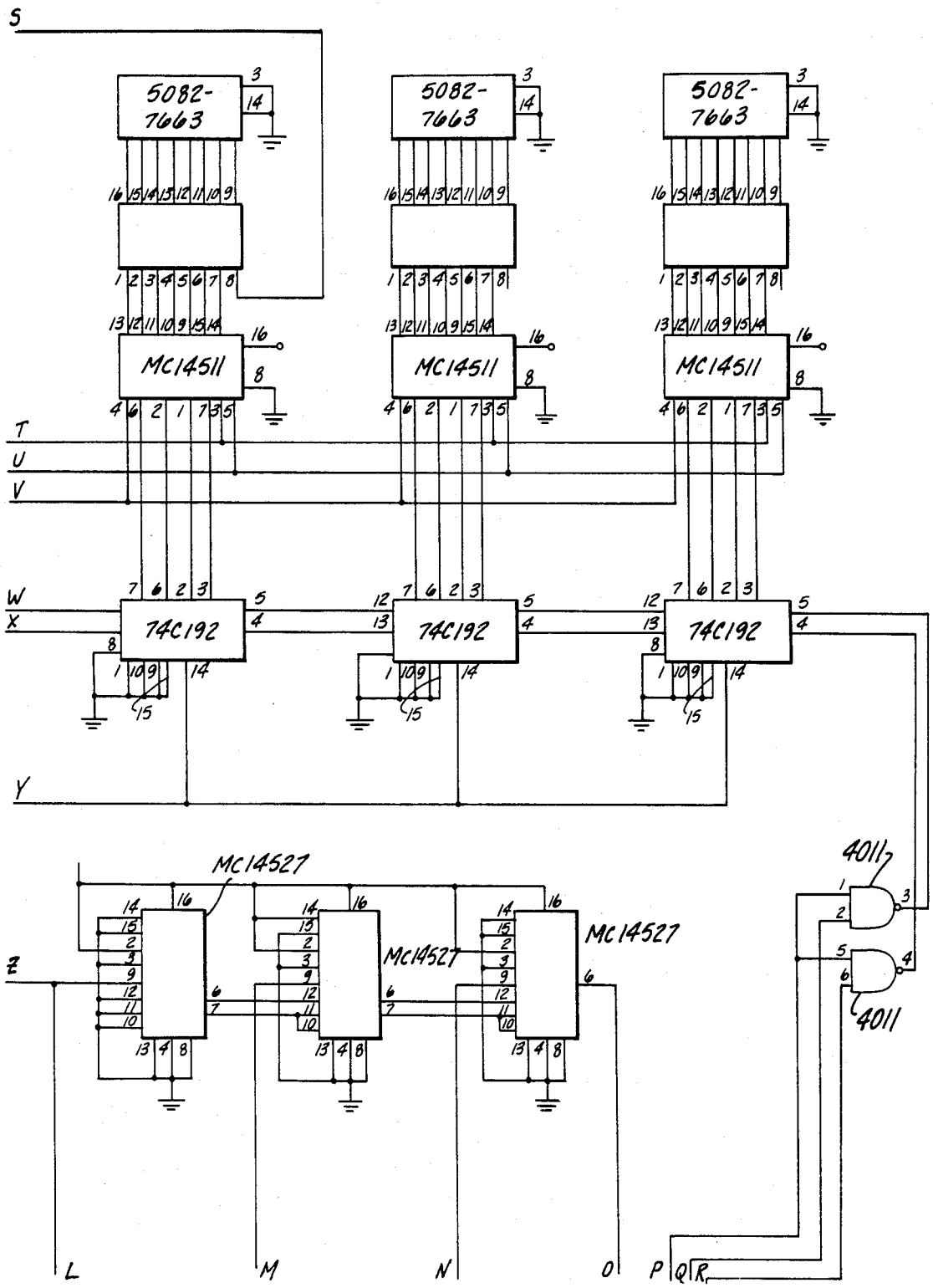
Figure 9C:
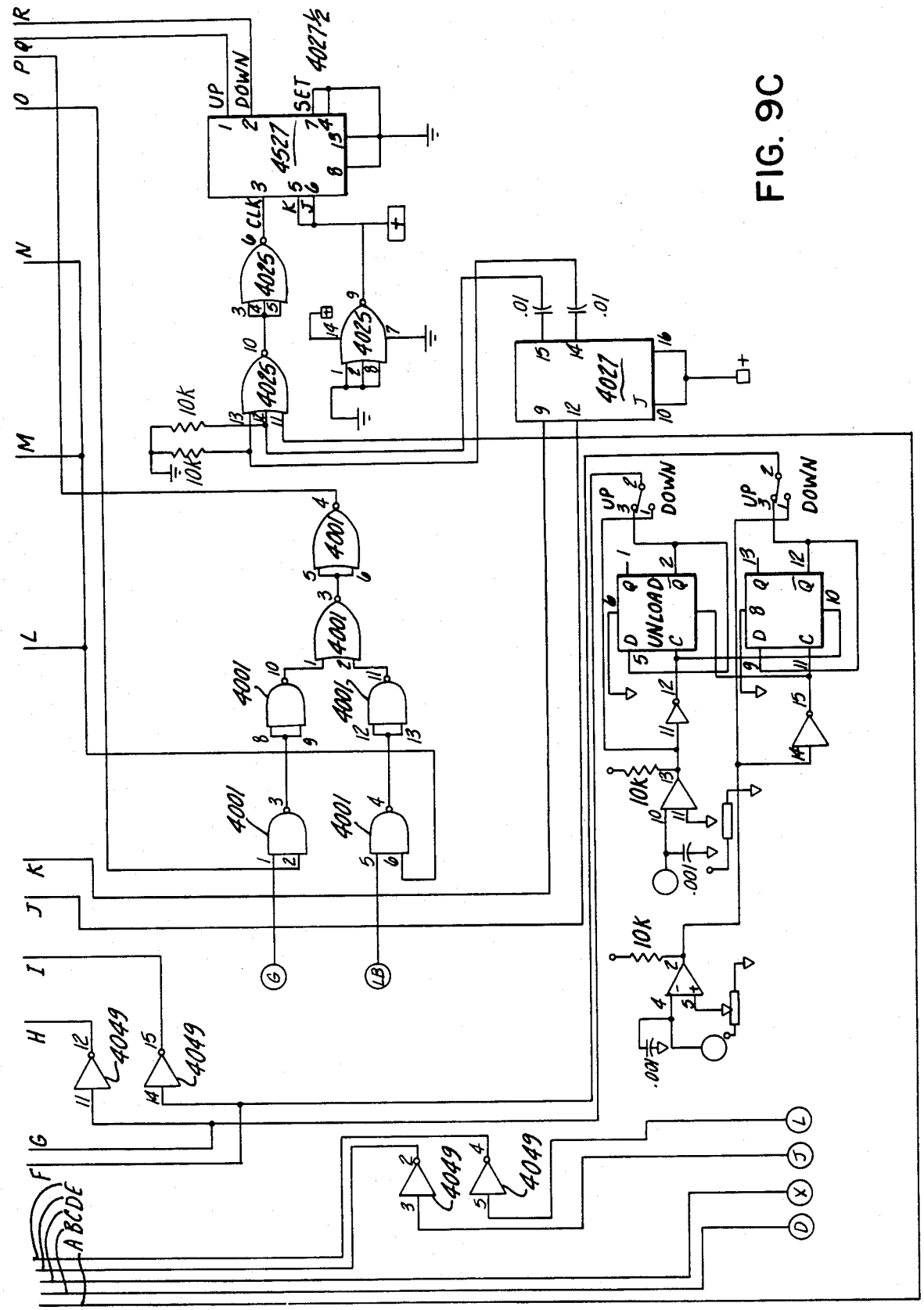
Figure 10A:
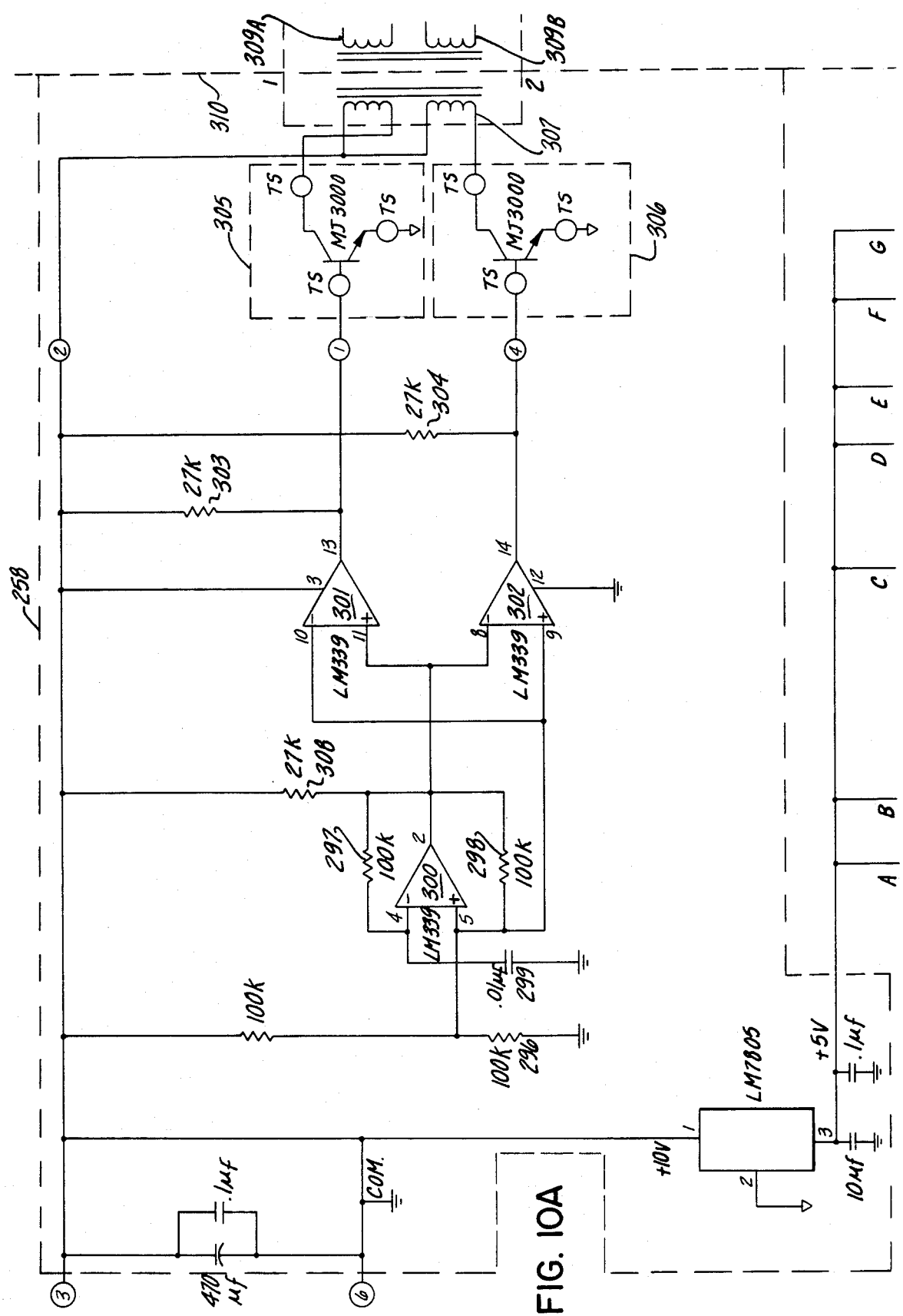
FIGS. 10A–10D are schematic diagrams of the circuits of FIGS. 5 and 6 as actually built.
Figure 10B:
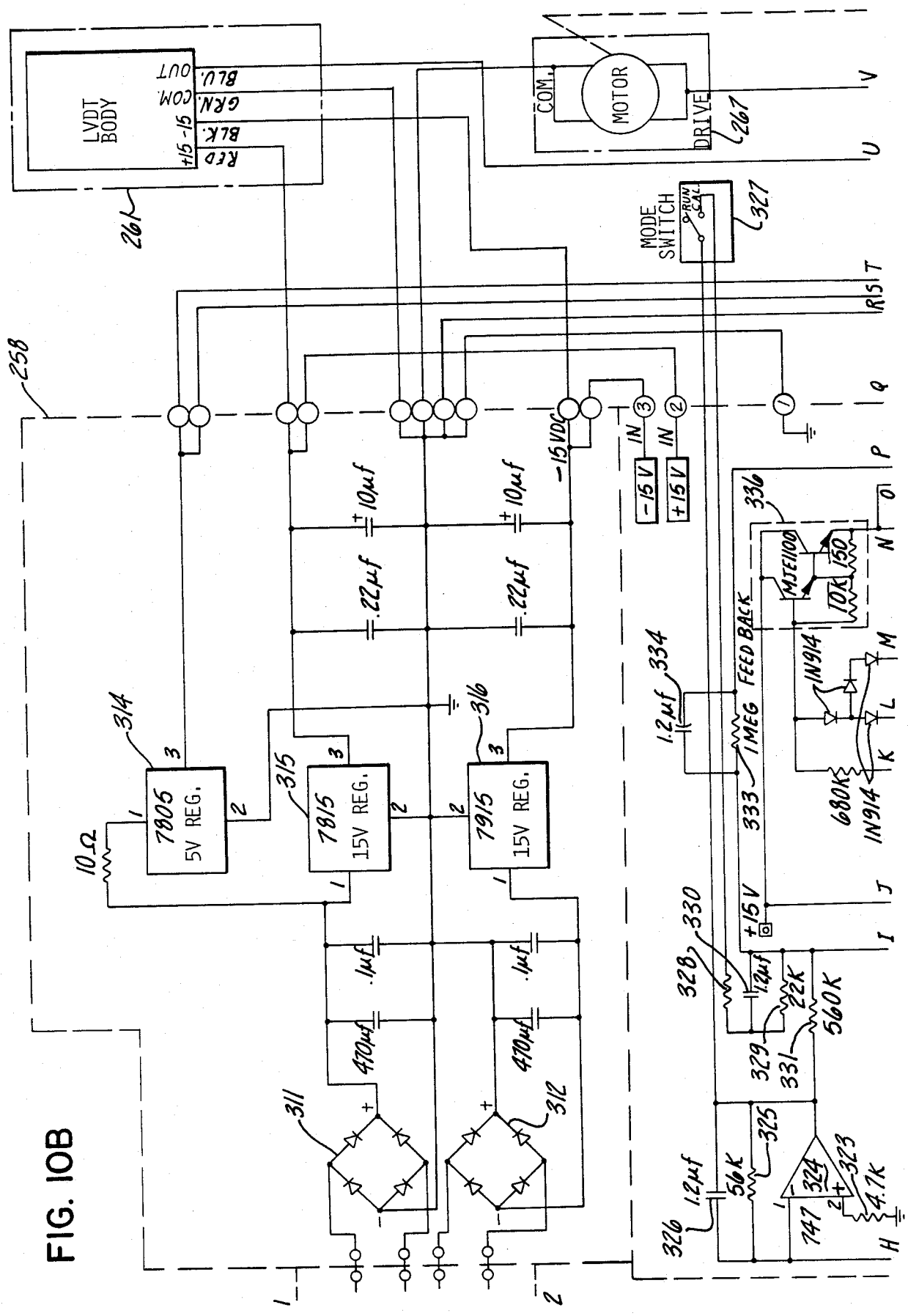
Figure 10C:
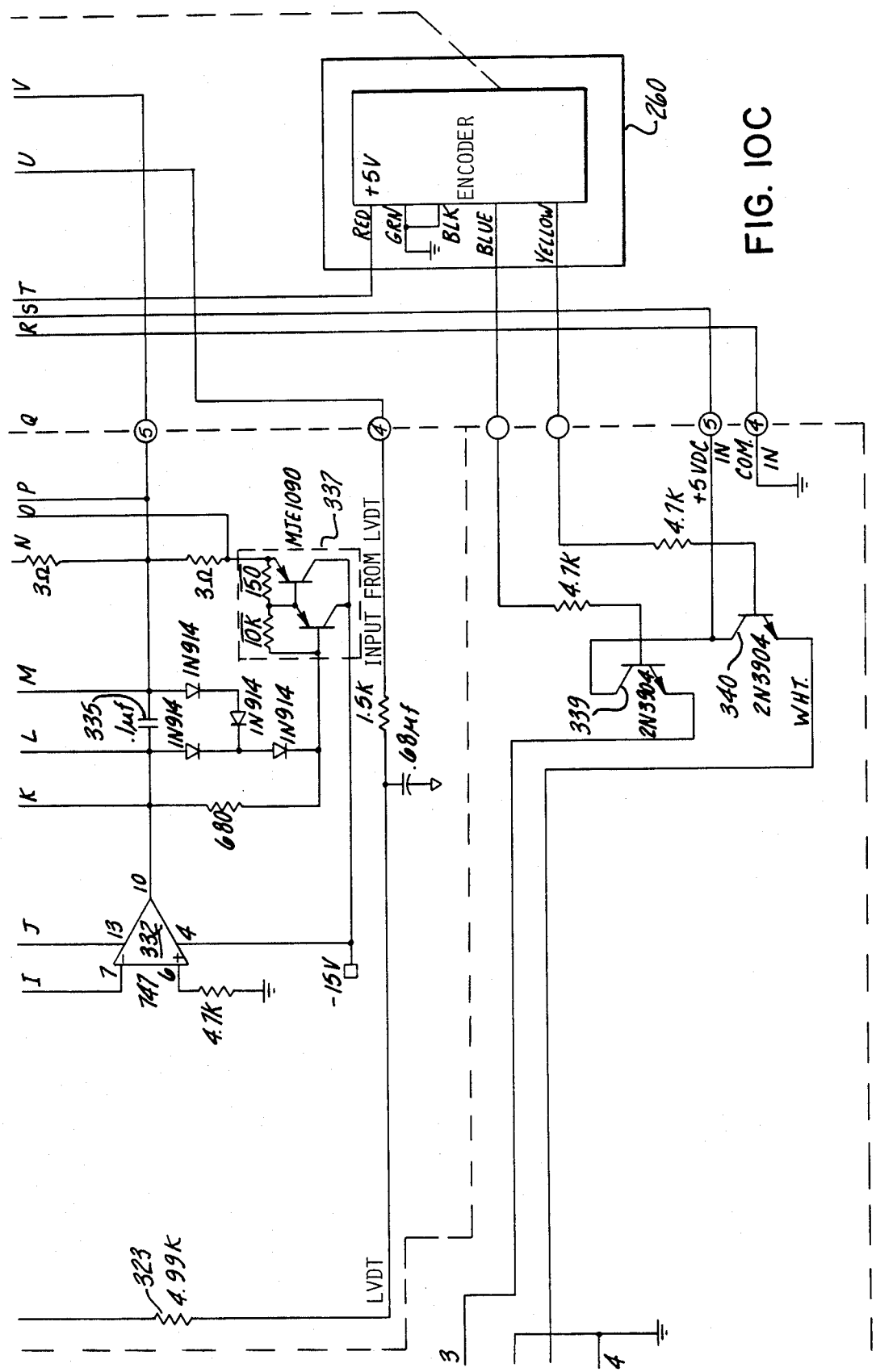
Figure 10D:
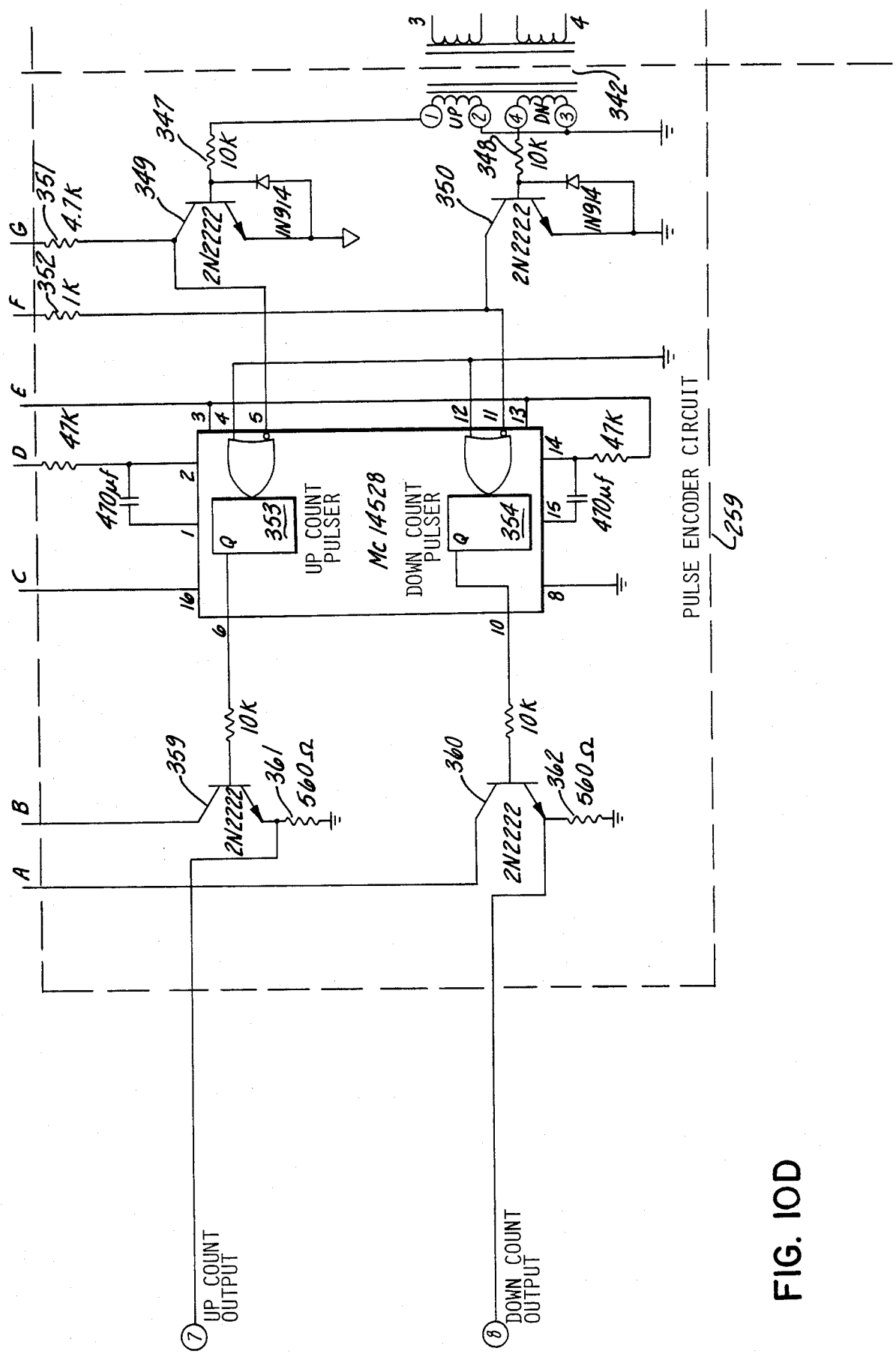
Figure 11A:
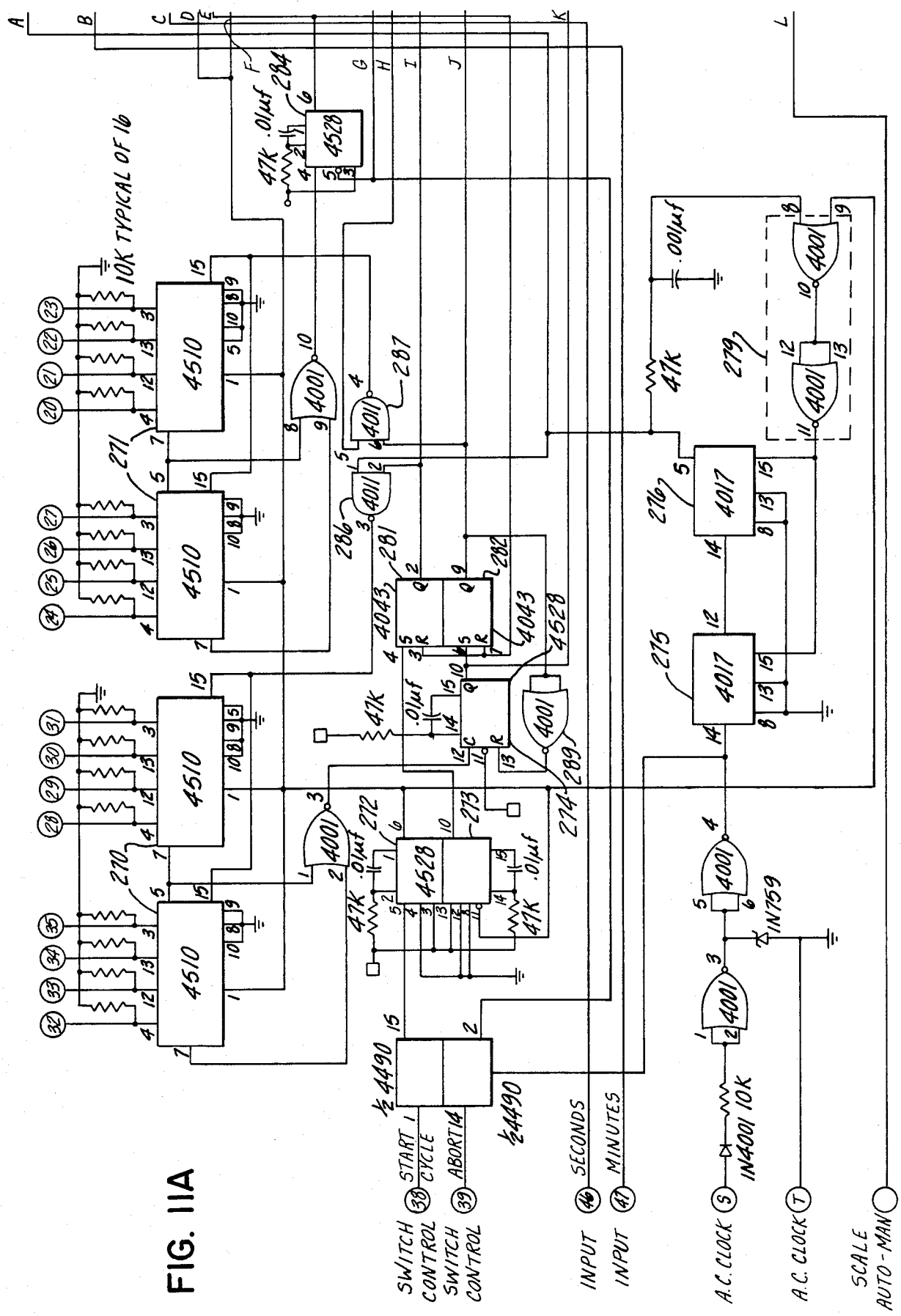
FIGS. 11A and 11B are schematic diagrams of the circuit of FIGS. 3 and 6 as actually built.
Figure 11B:
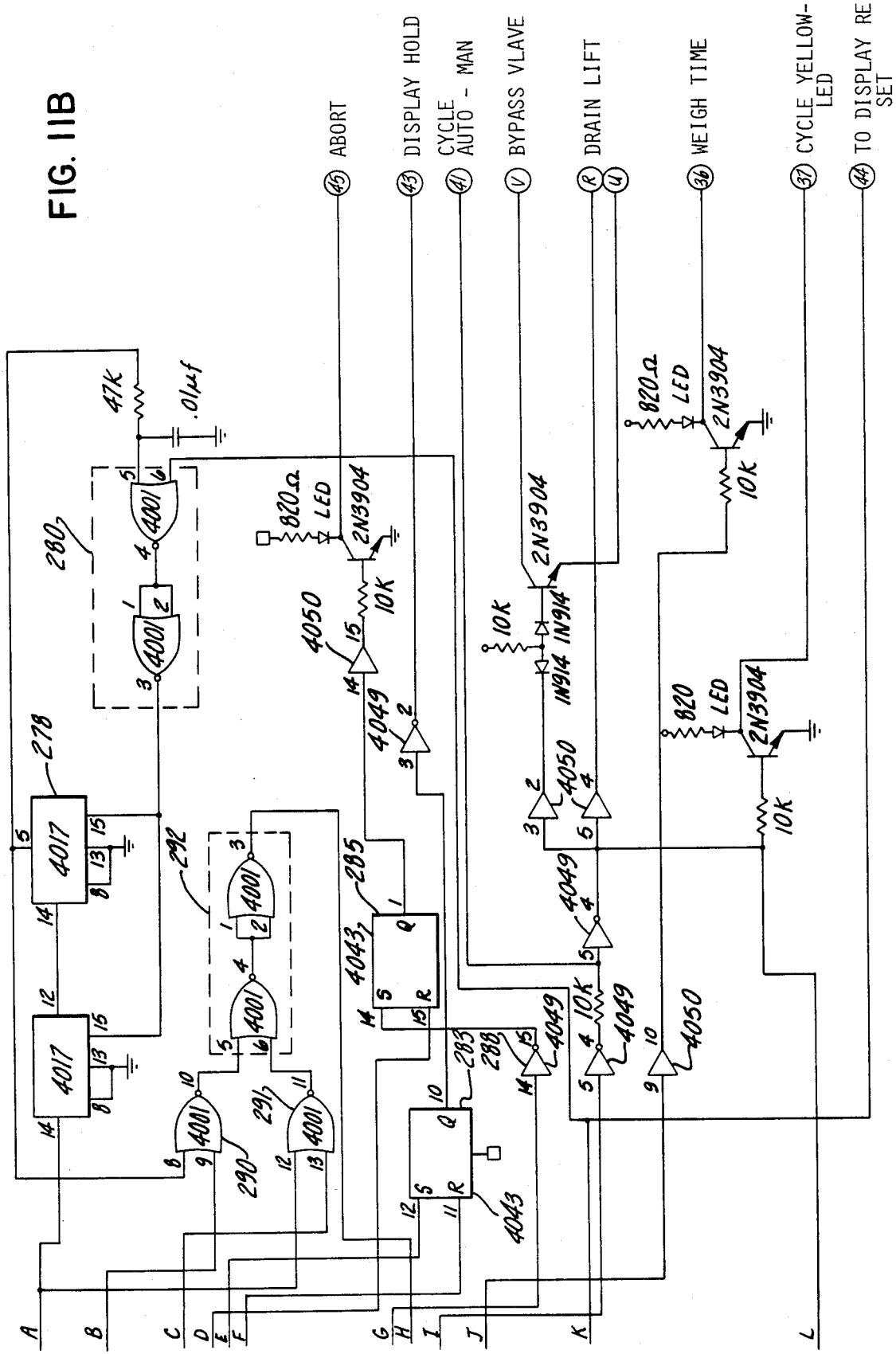
Figure 12:
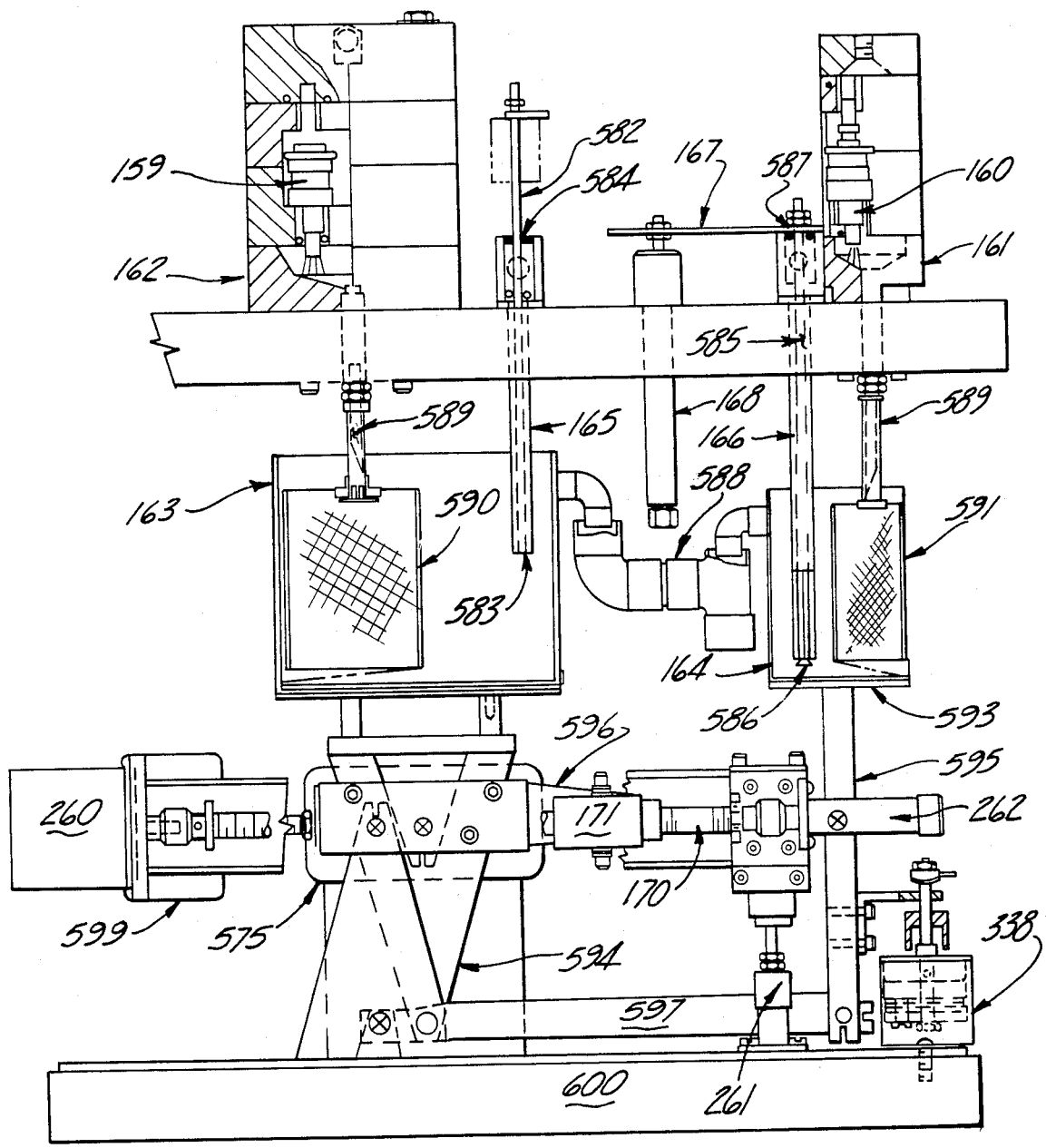
FIG. 12 is an elevational view of the weigh scale used in the present invention, and also showing the injectors used to supply the fuel to the weigh scale, as well as the extraction tubes used to remove the fuel.
Figure 13:
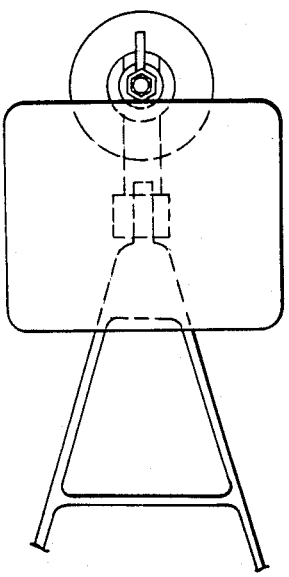
FIG. 13 is a partial plan view of the weigh scale of FIG. 12.

Now to describe the portion of the air gap transformer which is mounted to the scale as shown in FIG. 9, there are shown the secondary coil 309 of the air gap transformer. On the rotatable portion of the air gap transformer 310 is mounted the portion of the power supply circuit labeled 258B, which consists of a positive secondary coil 309A and a negative secondary coil 309B connected as shown. The positive secondary coil 309A is connected in a known manner to the positive rectifier 311, while the negative secondary coil 309B is connected to the negative rectifier 312.

In the known manner, these rectifiers are, in turn, connected to the plus 5-volt regulator, the plus 15-volt regulator and the minus 15-volt regulator 314, 315 and 316 respectively (FIG. 6), which provide power outputs to the scale components of plus 5, plus 15, and minus 15 volts respectively. It should be understood that the air gap transformer 310 just described is one of three air gap transformers on the scale, and two additional air gap transformers identified as a second air gap transformer and a third air gap transformer, 342 and 344 respectively, are in the pulse encoder circuit 259. This circuit is also known from previous weigh scales built by Applicants' assignee.

Having now brought power to the scale components, we use the plus 15 and minus 15-volt signal sources to energize the LVDT 261 which will produce a signal indicating the linear displacement of the scale. This signal, which is used to control the speed of the poise motor to keep the scale in balance, is supplied to the poise control circuit which is novel and an improvement over Applicants' previous poise control circuits.

The signal from the linear voltage displacement transformer 261 enters the poise control circuit through the first signal conditioning input resistor 323, and then travels to the inputs of the signal conditioning operational amplifier 324 and integrating capacitor 326. The output of the integrating capacitor 326 and the signal conditioner feedback resistor 325 are connected together and the signal therefrom is supplied, both to the output of the signal conditioning operational amplifier 324, and to one side of the calibrating switch 327. The output of the signal conditioning operational amplifier 324 is connected through a driver input resistor 331 to the negative input of the driver operational amplifier 332.

Returning to the calibrating switch 327 just discussed, connected to the other side of the calibrating switch 327 is a first calibrating input resistor 328. Connected in parallel between the first calibrating input resistor 328, and the negative input of the driver amplifier operational 332, are a second calibrating input resistor 329, and the rate determining capacitor 330.

The output of the driver operational amplifier is connected to the base of a positive follower Darlington transistor, as well as to the base of negative follower Darlington transistor, 336 and 337 respectively, as well as to the input of a crossover capacitor 335. The emitters of the positive follower Darlington transistor 336, and the negative follower Darlington transistor 337, are tied together and are connected to the output of the crossover capacitor 335.

The collector of the positive follower Darlington transistor is hooked to the plus 15-volt power available in the system, while the collector of the negative follower Darlington transistor is connected to a minus 15-volt potential. The emitters of the transistors 336 and 337, which were previously discussed are, in turn, connected to the poise motor 262 with the other connection to the poise motor being connected to the power supply. Thus, current is now being supplied to the poise motor and it is ready for operation.

However, two additional components of the poise control circuit which contribute to making it novel and an advance over Applicants' assignee's previous poise control circuit must still be discussed. These involve the driver feedback resistor 333 and the driver integrating capacitor 334 which are in parallel and connected between the emitters of the Darlington transistors 336 and 337, and the negative input of the driver operational amplifier 332.

Applicants have found in their previous poise control circuits two serious and opposite problems in attempting to dynamically weigh fuel while it is being introduced into a flow bucket on a weigh scale.

In the run mode, at very low flows, where you have fuel literally dripping into a bucket or, even worse, dripping slowly one drop at a time into a bucket, with Applicants' previous poise control circuit, the signal supplied by the linear variable displacement transformer 261 to the circuit would reflect this dripping type of flow even with the provision of the dash pot 338, and Applicants' felt that some type of integrator circuitry with a very low gain would be desirable to overcome this problem.

However, these are just the opposite requirements which are needed when one is to calibrate the scale by placing a dead weight in one of the weigh pans, and in such calibration it is desired to have the poise weight go quickly to one position and stop. If one attempts to calibrate with low gain and high integration, there will be such a time lag that the signal from the linear vertical displacement transformer will not get through the integrator circuitry in time to make the appropriate correction signal to the poise motor, and you will end up with a serious hunting condition in which the poise weight never stops.

Overcoming these mutually opposite problems provided a serious challenge to Applicants until their novel circuitry was discovered. Applicants felt that since the weigh scale operates in the run mode for a great percentage of the time, the circuitry that they build should have low gain with high integration and, indeed, it can be seen that the novel poise control circuit has a two-stage integrator function built in, but how to make this run in a calibrate mode reliably alluded Applicants until they came up with the idea of add on circuitry which would bypass such circuitry when required.

Applicants knew that they had to add gain without affecting the reliability of the integrator circuit, and had to subtract the integrator function, again without affecting reliability. Applicants finally achieved this by placing the calibrate switch 327, the first calibrate input resistor 328, and the second calibrate input resistor 329 in parallel with the driver input resistor 331 so that, when the calibrate switch was closed and, in effect, two resistances were put in parallel, this had the effect of giving a DC gain boost because the resistance in effect was lowered between the two operational amplifiers 324 and 332.

To achieve this effect simultaneously with converting the system to a low integration system, Applicants added a derivative effect to the circuitry, which is the inverse of the integrator effect, by placing the rate determinant capacitor 330 in parallel with the second calibrate input resistor 329. Thus, when the calibrate switch 327 is in its closed position, the circuitry has high gain with low integration for use in the calibrate mode, while when the calibrate switch is open the reliability of the circuitry which was carefully designed to provide low gain and high integration for the run mode at very low flows is preserved. Thus, Applicants have solved a long standing problem in the art as to how to dynamically measure low flows in a weigh scale in quick and accurate manner.

The remaining circuit which must be described to complete the description of the circuits related to the operation of the scale is the known pulse encoder circuit 259. As was previously discussed, power has been supplied to the encoder 260 which is mounted on the weigh scale at the opposite end thereof from the poise motor 262. The encoder output signals are supplied in the manner shown, and are connected one each to an up pulse follower transistor 339 and a down pulse follower transistor 340. The emitter of the up pulse follower transistor is connected to the primary coil 341 of the second air gap transformer 342, while the emitter of the down pulse follower transistor is connected to the primary coil 343 of the third air gap transformer 344.

Mounted to the stationary portion of the air gap transformer 344 is the secondary coil 345. The secondary coil of the second air gap transformer is indicated by the numeral 346 and this coil is connected through the up base resistor 347 to the base of the up inverter transistor 349, while the secondary coil 345 of the third air gap transformer 344 is connected through the down base resistor 348 to the base of the down inverter transistor 350.

The emitters of both the up inverter transistor and the down inverter transistor, 349 and 350 respectively, are connected to the system common. The collector of the up inverter transistor 349 is connected through an up pull-up resistor 351 with the 5-volt regulator 249 in the power supply circuit.

The collector of the down inverter transistor 350 is connected through the down pull-up resistor 352 with the same terminal on the 5-volt regulator 294. The collector of the up inverter transistor 349 is also connected to the input of the up count pulser 353, while the collector of the down inverter transistor is also connected to the input of the down count pulser 354.

The output of the up count pulser 353, in turn, is connected to the base of the up output follower transistor 359, while the output of the down count pulser 354 is connected to the base of the down output follower transistor 360. The base of the up output follower transistor 359 is connected to system common through the up emitter resistor 361, while the emitter of the down output follower transistor 360 is connected to system common through the down emitter resistor 362.

A major portion of the pulse encoder circuit past the air gap transformer itself has the function of improving the countability of the encoder pulses. Since the gap of the air gap transformers 342 and 344 can vary during operation, and the device is variable in other ways, the pulses coming from those secondary coils 345 and 346 can vary in characteristics from the pulses present at the primary coils 341 and 343 and make countability difficult and thus effect the accuracy of the system.

Figure 7:
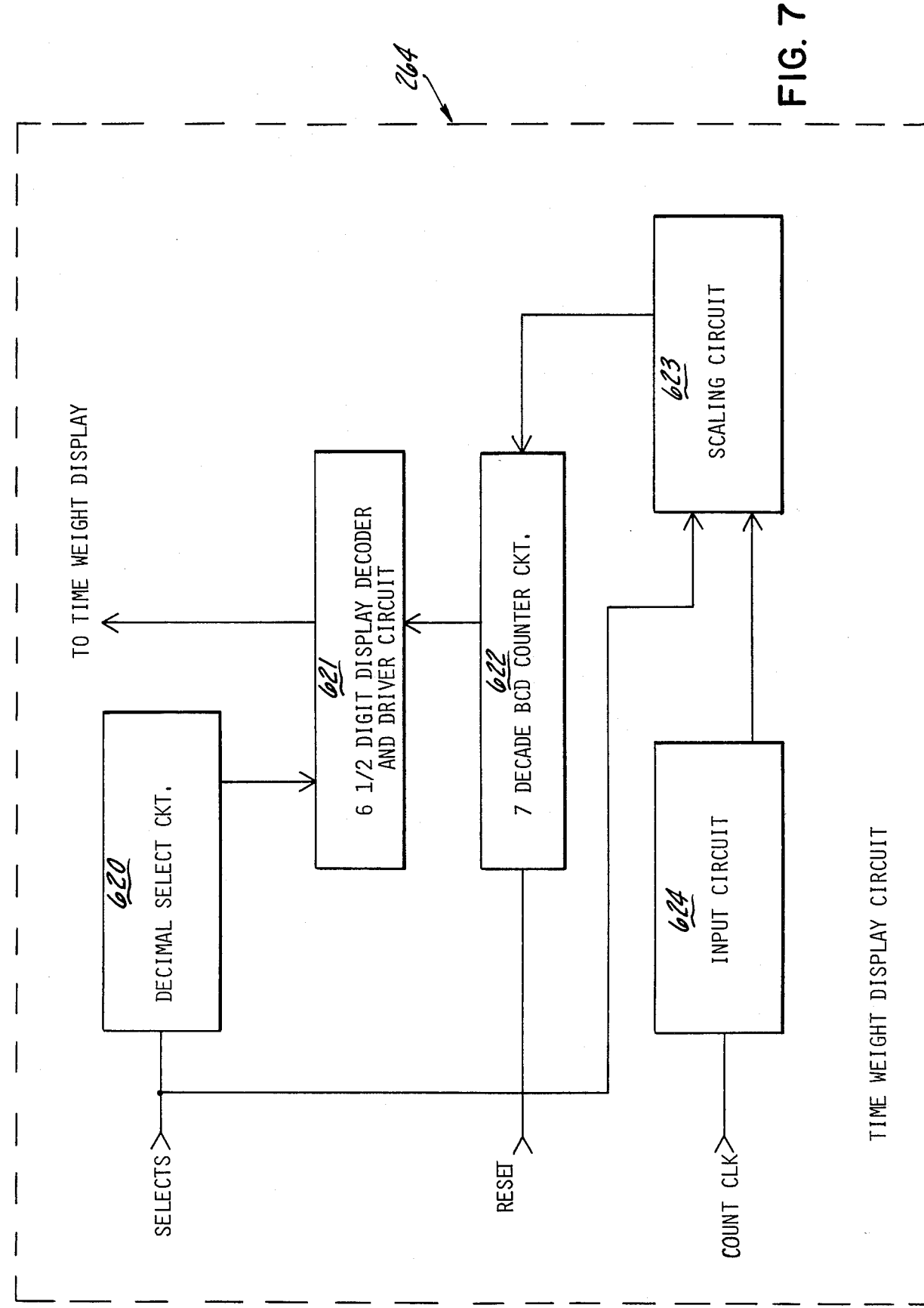
FIG. 7 is a block diagram of the time weight display circuit shown in FIG. 1.

By supplying the pulses to the count pulsers 353 and 354, the pulses are amplified, stretched out and made more uniform to make for easier countability when they are supplied through the up count output and the down count output to the time weight display circuit 264 which is more fully described in FIG. 7.

Figure 14:
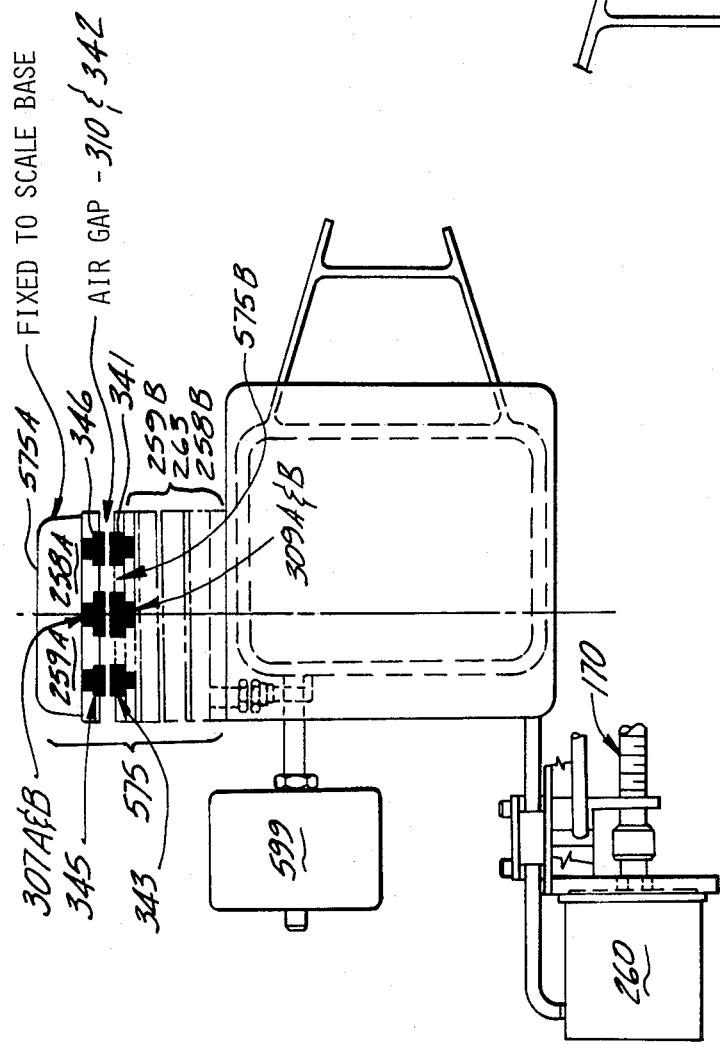
FIG. 14 is a partial plan view of the weigh scale shown in FIG. 12 showing the optical encoder, air gap transformer, counterweight and ball screw.
Figure 15:
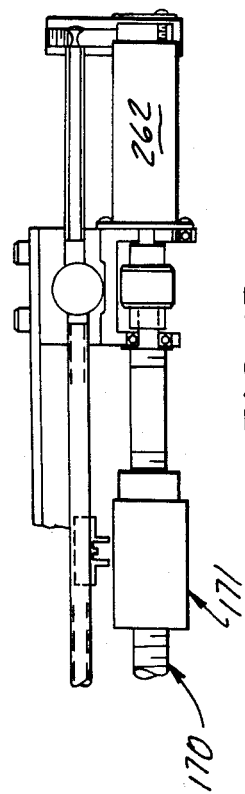
FIG. 15 is a partial elevational view of the weigh scale illustrated in FIG. 12 showing the drive motor, the ball screw and the movable poise weight.

We have now explained the circuitry involved with the air gap transformer, and to now show how the air gap transformer is physically mounted to the weigh scale, one may refer to FIG. 14 for a more detailed illustration of the complete air gap transformer, generally designated by the numeral 575, and the mounting thereof.

It can be seen that the axis of the air gap transformer 575 must be mounted on the center line of the primary fulcrum of the weigh scale. The transformer itself consists of a stationary portion 575A fixed to the scale base 600, and a movable portion 575B fixed to the upper scale beam 596.

As described, interposed between the rotatable portion of the transformer 575B and the upper scale beam 596 are several printed circuit boards containing on various portions thereof parts of circuits 259B, 263 and 258B which are portions of the time weight scale control and timing circuit 250.

Mounted on the stationary portion of the air gap transformer 575A are the primary coils 307A and 307B from the power supply ciruit, the second coil of the third air gap transformer 345 and the second coil of the second air gap transformer 346.

Mounted on the rotatable portion 575B of the transformer are the primary coil of the third air gap transformer 343, the second coil of the primary coil 341 and the positive secondary coil 309A and the negative secondary coil 309B of the power supply circuit.

Although air gap transformers are old in the art, we found none satisfactory for our purpose of using with weigh scales, and had to manufacture our own transformer using standard available commercial parts. Even though the scale has been known in the art, to enable one to practice the invention easily, some description thereof is offered thereon, primarily dealing with the winding of the primary coils about the cores necessary to make the transformer operate.

In regard to the primary and secondary coils of the power supply circuit, the core is what is known as a "ferroxcube" No. 3622 material with the primary coils 307A and 307B being wound with 50 turns of No. 24AWG wire in a bifilar wound pattern which, in effect, gives you a center tapped primary coil. The second coils 309A and 309B are each wound with 120 turns of No. 20AWG wire in a bifilar wound pattern which, in this case, gives you isolated secondary coils.

In regard to the primary coils 345 and 346 of the pulse encoder circuit, these are made of a ferroxcube No. 1408 material and both the primary windings 345 and 346 and the secondary windings 341 and 343 are made with 100 turns of a No. 34AWG wire. It is believed that no further description of the air gap transformer 575 is needed since this particular rotary transformer has been known to the art and, in addition, numerous texts and manufacturers' instructions are available to one skilled in the art.

A more detailed illustration of the time weight display circuit 264 is shown in FIG. 7. We can see that the time weight display circuit consists of a decimal select circuit 620 receiving a select signals such as the high-low select and the pounds/grams select signals as chosen by the operator. The decimal select circuit 260 outputs a signal to the 6½ digit display decoder and driver circuit 621.

The select signals just mentioned are also supplied to a scaling circuit 623. A reset signal is supplied to the seven decade BCD counter circuit 622 which also receives the output of the scaling circuit 623.

Figure 8A:
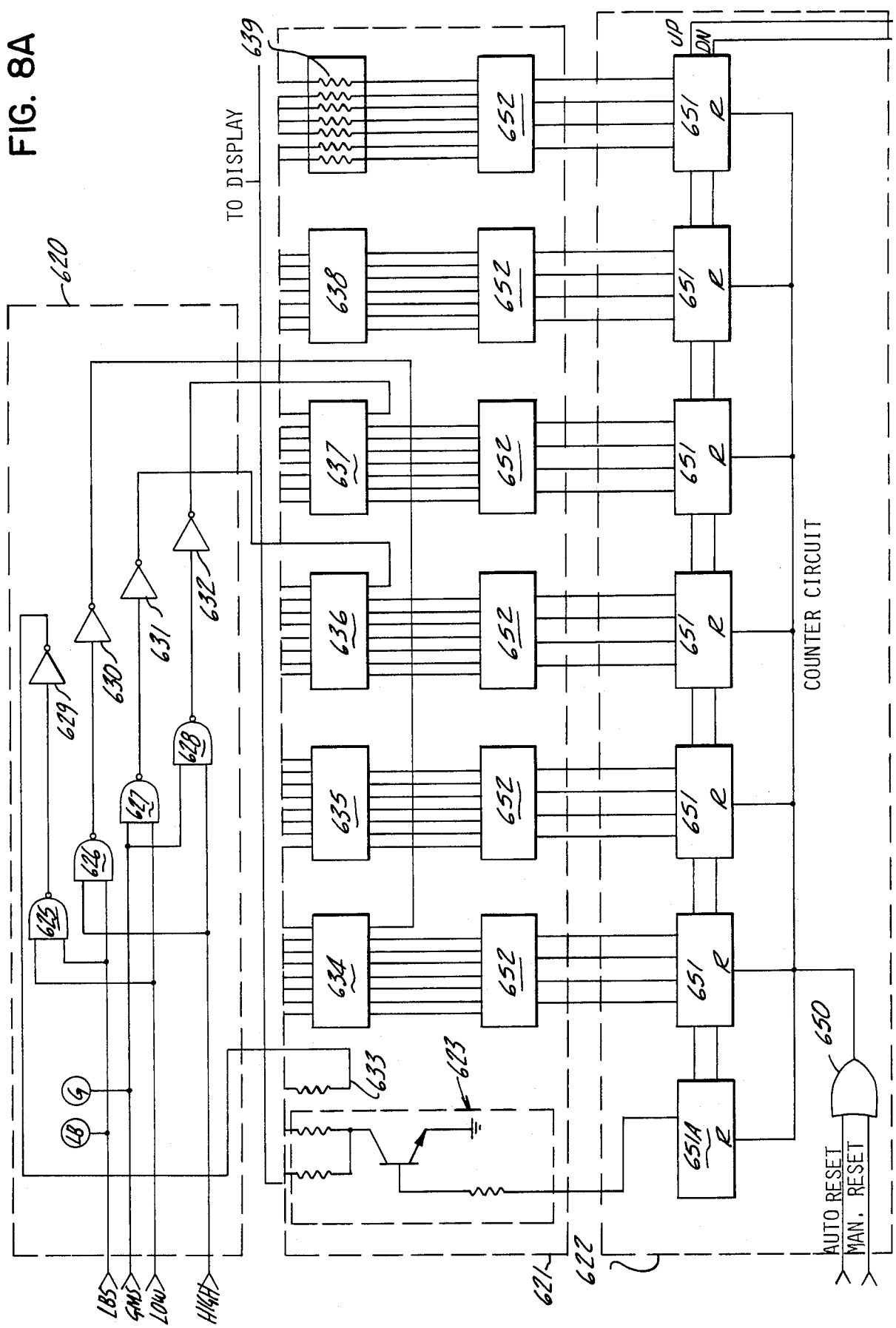
FIGS. 8A and 8B are circuit diagrams corresponding to the block diagram of FIG. 7.
Figure 8B:
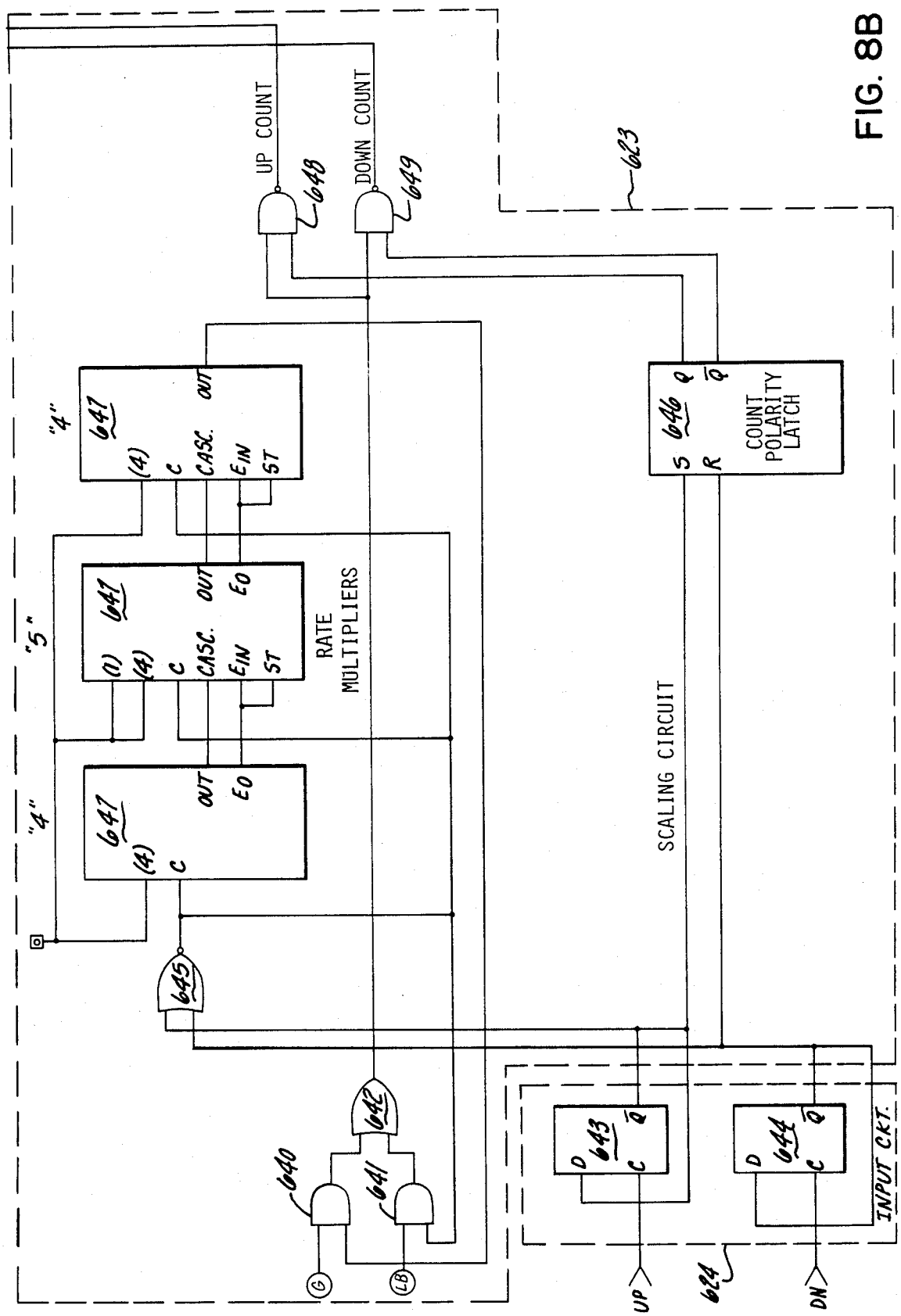

A clock signal is supplied to the input circuit 624 and the output of input circuit 624 forms the second input to scaling circuit 623. All of this has the effect of providing a signal from the seven decade BCD counter 622 to the 6½ digit display decoder and driver circuit 621, which it will be recalled is receiving an input from the decimal select circuit 620, and causing an output to go from this circuit to the time weight display 241. A more detailed description of the block diagrams of FIG. 7 can be obtained by referring to FIGS. 8A and 8B.

The purpose of the decimal select circuit 620 is to place the decimal point in the correct position in the time weight display 241 depending on whether the pounds or grams input are selected from the pounds/grams switch 244, or the high and low flow through the injectors is selected by the high-low select switch 197. Based on these selections, you could have four possible positions of the decimal point on the meter. This is because you can have four different combinations of flow. You can have pounds of flow in low or high flow, and grams of flow in low flow or high flow.

To illustrate the outputs occurring, let use first assume that we have signals coming in on the pounds and low flow lines, which would supply an input to one input of the first decimal select NAND gate 625 and to one input of the second decimal select NAND gate 626. The output of the first and second decimal select NAND gates respectively are supplied to the input of the first and second decimal select inverters, 629 and 630 respectively.

The output of the first and second decimal select inverters is in each case outputted. The output of the first decimal select inverter 629 goes to the input of the most significant digit 633, while the output from the second decimal select NAND gate 626 goes through the second decimal select inverter 630 to the second most significant digit 634.

Since we must, of course, have along with the indication of pounds a low or high indication, let us assume now that we have a low indication, which will cause an input into the third decimal select NAND gate 627. Since there is not an input from the grams input to the third decimal select NAND gate 627, there will be no outputs from that AND gate, but there will be now the second input, because of the low signal, to the first decimal select NAND gate 625 which will be passed through the first decimal select inverter 629 to the most significant digit which will now light a decimal point.

It can be seen by tracing the various combinations that, for having the pounds and high signal, a signal will travel from the second decimal select NAND gate 626 through the second decimal select inverter 630 to the second most significant digit 634. Taking the grams low and high examples, when you have a grams and a low signal, it can be seen that a signal will pass through the third decimal select NAND gate 627 and through the third decimal select inverter 631, to the fourth most significant or middle digit 636. Similarly, when a grams and high signal is present, an output will be forthcoming from the fourth decimal select NAND gate 628 through the fourth decimal select inverter to the fifth most significant digit 637.

It can be seen that in the present embodiment of our invention, we choose not to use decimal points associated with the third most significant digit 635 and the sixth and seventh most significant digits 638 and 639 respectively.

As just described, the pounds and grams signals also are supplied to one input of the scaling circuit 623 and are supplied one each to the input of the first scaling circuit AND gate 640 (FIG. 8B) and the second scaling circuit AND gate 641. At the same time the grams and pounds signals are being supplied to the first scaling circuit AND gate 640 and the second scaling circuit AND gate 641, the up and down clock signals from the pulse encoder 97 are being supplied to the first input latch 643 and the second input latch 644. The Q bar output from the first and second input latches is being supplied is connected to the inputs of the two input NOR gates 645 and to the count polarity latch 646.

Depending on whether grams or pounds are selected, the output of the two input NOR gate 645 is supplied to each of three identical rate multipliers 647, and also to the second input of the second scaling circuit AND gate 641, which, if a pound signal is being supplied, will cause an output to occur from the scaling circuit OR gate 642 and provide an input to both the up NAND gate 648 and the down NAND gate 649, and depending on which of the first input latch or second input latches are supplying the signal to the count polarity latch, the other input to the up NAND gate 648 or the down NAND gate 649 will be provided which is necessary to provide the proper signals to the counter circuit 622.

It should be noted that in the case where the grams signal is being supplied to the first scaling circuit AND gate 640, the grams conversion factor of four, five and four are set into the rate multipliers 647, which will cause the correct count to be transmitted through the first scaling circuit AND gate 640 and the scaling circuit AND gate 641 and scaling circuit OR gate 642 to the inputs of the up NAND gate 648 and the down NAND gate 649.

Here again, depending on whether the first input latch 643 or second input latch 644 is supplying a signal to the count polarity latch 646, either the up NAND gate 648 or the down NAND gate 649 will receive the second input which it needs to provide an output through the counter circuit 622.

To now describe the counter circuit in more detail, it can be seen that this circuit receives a manual reset signal from the auto manual switch 363 and an auto reset signal from the float detection control circuit 381. This signal comes into a reset OR gate 650. It is to be noted that it does not matter which of these signals is being supplied, as it long as either signal is being supplied, an output will be provided from the reset OR gate to each of the seven BCD counters in the seven decade BCD counter circuit 622. Providing that neither the auto reset or manual reset signals is causing an output from the reset OR gate 650, the counters will immediately start counting up or down upon receipt of an up or down signal from the scaling circuit 623 and this will continue until either the auto reset or manual reset signal is received by the reset OR gate 650 which will immediately, but momentarily, cause all the counters to be reset to zero. Each of the decade counters 651 in the seven decade BCD counter circuits are connected to a corresponding decoder driver 652 in the 6½ digit display decoder and driver circuit, except the most significant counter 651A, which is connected directly to a transistor driver circuit 623, well known in the art.

The decoder drivers 652, upon receiving signals from the decade counters, provide the appropriate seven segment code to the appropriate digits 633-639 respectively. In turn, the signals from the significant digits 633-639 provide the necessary signal to the time weight display 241 to illuminate the same, and provide the system operator with an accurate an instantaneous indication of the weight present in the weigh scale at any time.

Now that we have seen how the weigh scale in our system dynamically weighs fuel as it is placed on the scale to eliminate the problems long standing in the art due to scale friction, and the errors due to static weight and fuel drip effects at low flows, we shall now describe how the signals coming from the weigh scale are utilized to display the weight of fluid in the scale at any given time.

We have already in general described the mechanics of the weigh scale of our present invention, but certain additional features should be described, which are important to our invention.

It should be known that in constructing our scale we started with the standard Tridyne scale which is commercially available as Model No. 410-1052 manufactured by the Tridyne Corporation. This scale came with the standard base 600, the large platform support 594, the small platform support 595, the lower beam 597 and the upper beam 596. To this we added the encoder 260, the counterweight 599, the ball screw 170, the poise weight and ball nut assembly 171 and the poise motor 262, together with the large flow bucket 163 and the low flow bucket 164 previously described.

With regard to the ball scew, it should be understood that a very accurate ball screw with a very fine thread was found to be necessary to provide the desired degree of calibration for accurate weighing. The ball screw which we chose after much experimentation is one manufactured by Beaver Precision Products, their Model No. PO805 20-pitch ball screw. The ball screws we tried previous to this simply were not accurate enough for our purposes.

A drain assembly 588 is provided as shown in case of overflow from either the high flow bucket 163 or the low flow bucket 164. Many features of the injection system and extraction system have already been described, but one feature which is important which is not previously been described is the shape of the smooth flow tube assembly 589.

It can be seen that the rakish angle at the end of the assembly, plus the shape of the discharge deflectors at the end thereof, are intended to minimize kinetic energy effects, as are the wool mesh kinetic energy absorption devices 590 and 591 respectively.

With respect to the extraction systems, it should be noted that the high flow extraction tube assembly 165 and the low flow extraction tube assembly 166 retract during the test cycle to eliminate the buoyancy effect which they otherwise would have.

To prevent any drippage from occurring when they are retracted, which would effect the measuring result, it should be noted that a high flow evacuation valve seat 583 is provided on the end of the flow lift rod providing part of the assembly. The lift rod 582 is sealed by a high flow evacuation seal 584.

Similarly, a low flow evacuation valve seat 586 is provided on the end of the low flow lift rod 587 which is sealed by a low flow evacuation seal 587. This concludes the description of the mechanical features of our scale which are necessary to effectuate the accurate measurements needed in our system.

Thus, by developing improved circuitry for our weigh scale which allows for better running of the scale in its dynamic weighing condition, but also provides an improved calibration circuit, we have provided a novel and extremely accurate weigh scale for use in a variable weight fixed time system, whether it be used for calibrating flow meters at a wide range of flows, or for other purposes.

We claim:

1. In a weigh scale of the dual-beam type having large and small platform supports supporting high-flow and low-flow buckets respectively, a linear variable differential transformer to detect vertical movement of said platform supports, a ball screw with a movable poise weight operatively attached to one of said dual beams to keep said scale in balance while media is flowing into one of said buckets by movement of said poise weight, an encoder operatively attached to said ball screw to record the movement thereof, a poise motor to turn said ball screw, a pulse encoder, and a pulse encoder circuit to produce pulse train signals related to the movement of said ball screw, and a poise control circuit to accept signals from said pulse encoder circuit and said linear variable differential transformer to control the operation of said poise motor to keep said scale in balance as media enters said flow buckets, the improvement consisting of an improved poise control circuit including in combination circuitry providing low gain with high integration for use while said scale is running and, in addition, being adapted to provide a DC gain boost when said scale is being calibrated to provide for high gain and derivative action of said circuitry during calibration.

2. The device defined in claim 1, wherein said improved poise control circuit includes a first signal conditioning input resistor operatively connected to said linear variable differential transformer.

3. The device defined in claim 2, and including a signal conditioning operational amplifier having a negative input, a positive input and an output, with said signal conditioning input resistor being connected to said negative input.

4. The device defined in claim 3, and including a signal conditioning feedback resistor connected between said negative input of said signal conditioning operational amplifier and said output of said signal conditioning operational amplifier.

5. The device defined in claim 4, and including an integrating capacitor connected in parallel with said signal conditioning feedback resistor.

6. The device defined in claim 5, and including a driver operational amplifier having a negative input, a positive input and an output.

7. The device defined in claim 6, and including a driver input resistor connected between said negative input of said driver operational amplifier, and said output of said signal conditioning operational amplifier.

8. The device defined in claim 7, and including a runcalibrate switch connected to the output of said signal conditioning operational amplifier.

9. The device defined in claim 8, and including a first calibrate input resistor connected to the other terminal of said run-calibrate switch.

10. The device defined in claim 9, and including a second calibrate input resistor connected in series with said first calibrate input resistor.

11. The device defined in claim 10, and including a rate determinant capacitor connected in parallel with said second calibrate input resistor.

12. The device defined in claim 11, and including a positive follower Darlington transistor having an emitter, a base and a collector, with said base connected to said output of said driver operational amplifier, said collector connected to positive system voltage and said emitter connected to said poise motor.

13. The device defined in claim 12, and including a negative follower Darlington transistor having an emitter, a base and a collector, said base connected to said output of said driver operational amplifier, said emitter of said positive follower Darlington transistor and said poise motor, and said collector connected to said negative system voltage.

14. The device defined in claim 13, and including a cross over capacitor interposed between the emitters of said Darlington transistors and the output of said driver operational amplifier.

15. The device defined in claim 14, and including a driver feedback resistor connected between said negative input of said driver operational amplifier and said emitters of said Darlington transistors.

16. The device defined in claim 15, and including a driver integrating capacitor connected in parallel with said driver feedback resistor.

* * * * *